(12) United States Patent
Bronstein et al.

(10) Patent No.: US 8,259,794 B2
(45) Date of Patent: Sep. 4, 2012

(54) METHOD AND SYSTEM FOR ENCODING ORDER AND FRAME TYPE SELECTION OPTIMIZATION

(76) Inventors: Alexander Bronstein, San Jose, CA (US); Michael Bronstein, Santa Clara, CA (US)

( * ) Notice: Subject to any disclaimer, the term of this patent is extended or adjusted under 35 U.S.C. 154(b) by 973 days.

(21) Appl. No.: 12/199,741

(22) Filed: Aug. 27, 2008

(65) Prior Publication Data

US 2010/0054329 A1 Mar. 4, 2010

(51) Int. Cl.
*H04N 7/12* (2006.01)
(52) U.S. Cl. ............... 375/240.03; 375/240.26
(58) Field of Classification Search ............ 375/240.01, 375/240.02, 240.03, 240.26
See application file for complete search history.

(56) References Cited

U.S. PATENT DOCUMENTS

| | | | |
|---|---|---|---|
| 6,289,354 B1* | 9/2001 | Aggarwal et al. .................. 1/1 |
| 6,711,211 B1* | 3/2004 | Lainema ................. 375/240.24 |
| 6,731,605 B1* | 5/2004 | Deshpande .................. 370/252 |
| 6,763,068 B2* | 7/2004 | Oktem ................... 375/240.03 |
| 7,788,191 B2* | 8/2010 | Jebara ............................ 706/12 |
| 2002/0095439 A1* | 7/2002 | Long et al. .................... 707/507 |
| 2006/0188014 A1* | 8/2006 | Civanlar et al. .......... 375/240.03 |
| 2008/0232466 A1* | 9/2008 | Faerber et al. ........... 375/240.03 |

\* cited by examiner

*Primary Examiner* — Ricky Ngo
*Assistant Examiner* — Christine Ng
(74) *Attorney, Agent, or Firm* — Stephen E. Zweig

(57) ABSTRACT

A method for resource allocation for video encoder to achieve the minimum sequence cost within given resource budgets. Optimal video encoder design by deriving the optimal sequence order and frame type selection is invented. In order to achieve computationally practical resource allocation, the current invention utilizes various encoder model and buffer model. The models allow the optimization procedure to assess the best encoding design without actually performing the computationally expensive encoding. Efficient optimization algorithm is also derived to substantially reduce the computations required to search for the optimal action sequence.

3 Claims, 5 Drawing Sheets

General Optimal Resource Allocation Process.

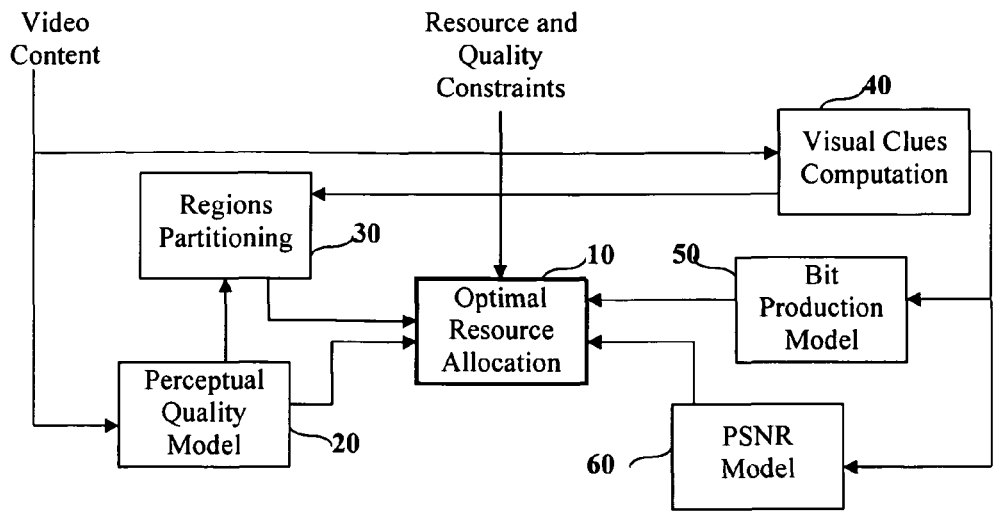
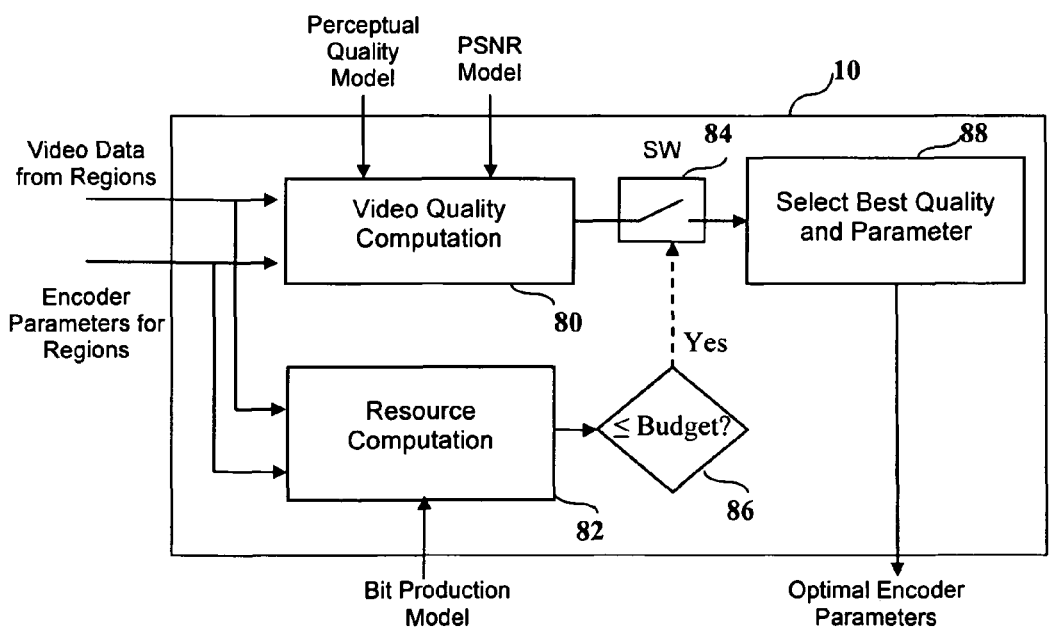
Figure 1a. Block Diagram of the Optimal Resource Allocation for Video Content.
Figure 1b. General Optimal Resource Allocation Process.

RAW FRAME BUFFER

ENCODER BIT BUFFER

ENCODER BIT BUFFER

METHOD AND SYSTEM FOR ENCODING ORDER AND FRAME TYPE SELECTION OPTIMIZATION

BACKGROUND

The present invention relates to the field of encoder control more specifically, the present invention relates to frame encoding decision for video sequence to achieve a minimum sequence cost within a sequence resource budget.

Video compression takes advantage of these redundancies, with the intention to reduce the size of the video data while maintaining the quality as much as possible. Such compression is referred to as lossy (as opposed to lossless), since the original data cannot be recovered exactly. Most modern codecs take advantage of correlation among video frames and transmit the differences between a current frame and a predicted frame compactly represented by prediction parameters. The predicted frame is usually similar to the original one. The residual information, i.e., prediction error, is transmitted together with the prediction parameters. The error signal usually is much smaller than the original signal and can be compactly represented using spatial transform, such as the discrete cosine transform (DCT) with subsequent quantization of the transform coefficients. The quantized coefficients and the prediction parameters are entropy-encoded to reduce furthermore their redundancy.

Inter-prediction exploits the temporal redundancy by using temporal prediction. Due to high level similarity among consecutive frames, temporal prediction can largely reduce the information required to present the video data. The efficiency of temporal prediction can be further improved by taking into account the object motion in the video sequence. The motion parameters associated with temporal prediction are transmitted to the decoder for reconstructing the temporal prediction. This type of prediction is used in MPEG-like codecs. The process of producing intra-prediction is called motion estimation. Typically, it is performed in a block-wise manner, when many modern codec support motion estimation with blocks of adaptive size.

At the other end, intra-prediction takes advantage of spatial redundancy and predicts portions of a frame (blocks) from neighbor blocks within the same frame. Such prediction is usually aware of spatial structures that may occur in a frame, namely smooth regions and edges. In general, larger block size is more coding efficient for smooth areas and smaller block size is more coding efficient for areas with more texture variations. In the latter case, the prediction based on neighboring blocks can improve coding efficiency and a directional prediction can even further improve the efficiency. Such intra-prediction is used in the recent H.264 Advances Video Codec (AVC) standard.

The actual reduction in the amount of transmitted information is performed in the transmission of the residual. The residual frame is divided into blocks, each of which undergoes a DCT-like transform. The transform coefficients undergo quantization, usually performed by scaling and rounding. Quantization allows represent the coefficients by using less precision, thus reducing the amount of information required. Quantized transform coefficients are transmitted using entropy coding. This type of coding exploits the statistical characteristics of the underlying data.

For color video, often they are represented in the RGB color coordinate. However, in most video coding systems, the encoder usually uses the YCbCr color space because it is a more compact representation. Y is the luminance component (luma) and Cb and Cr are chrominance components (chroma) of the color video. The chroma is typically down-sampled to half frame size in each direction because human eyes are less sensitive to the chroma signals and such format is referred to as the 4:2:0 format.

The performance of a lossy video codec is measured as the tradeoff between the amount of bits required to describe the data and the distortion introduced by the compression, referred to as the rate-distortion (RD) curve. As the distortion criterion, the mean squared error (MSE) is usually used. The MSE is often converted into logarithmic units and represented as the peak signal-to-noise ratio (PSNR), $$p = 10\log_{10}\left(\frac{y_{max}^2}{d}\right) \qquad (1)$$

where d is the MSE and $y_{max}$ is the maximum allowed value of the luma pixels, typically 255 if the luma data has an 8-bit precision and is represented in the range 0, ..., 255.

The H.264 AVC is one of the most recent standards in video compression, offering significantly better compression rate and quality compared to the previous MPEG-2 and MPEG-4 standards and targeted to high definition (HD) content. For example, H.264 delivers the same quality as MPEG-2 at a third to half the data rate.

The encoding process can be briefly described as follows: a frame undergoing encoding is divided into non-overlapping macroblocks, each containing 16×16 luma pixels and 8×8 chroma pixels. Within each frame, macroblocks are arranged into slices, where a slice is a continuous raster scan of macroblocks. Each slice can be encoded independently of the other. Main slice types are P and I. An I slice may contain only I macroblocks; a P slice may contain P or I macroblocks. The macroblock type determines the way it is predicted. P refers to inter-predicted macroblocks; such macroblocks are subdivided into smaller blocks. I refers to intra-predicted macroblocks; such macroblocks are divided into 4×4 blocks (the luma component is divided into 16 blocks; each chroma component is divided into 4 blocks). In I mode (intra-prediction), the prediction macroblock is formed from pixels in the neighbor blocks in the current slice that have been previously encoded, decoded and reconstructed, prior to applying the in-loop deblocking filter. The reconstructed macroblock is formed by imitating the decoder operation in the encoder loop. In P mode (inter-prediction), the prediction macroblock is formed by motion compensation from reference frames. The prediction macroblock is subtracted from the current macroblock. The error undergoes transform, quantization and entropy coding. According to the length of the entropy code, the best prediction mode is selected (i.e., the choice between an I or a P macroblock, the motion vectors in case of a P macroblock and the prediction mode in case of an I macroblock). The encoded residual for the macroblock in the selected best mode is sent to the bitstream.

A special type of frame referred to as instantaneous data refresh (IDR) is used as a synchronization mechanism, in which the reference buffers are reset as if the decoder started "freshly" from the beginning of the sequence. IDR frame is always an I-frame. The use of IDR allows, for example, starting decoding a bitstream not necessarily from its beginning. The set of P and I frames between two IDRs is called a group of pictures (GOP). A GOP always starts with an IDR frame. The maximum GOP size is limited by the standard.

The operating point on the RD curve is controlled by the quantization parameter, determining the "aggressiveness" of the residual quantization and the resulting distortion. In the H.264 standard, the quantization parameter is an integer in the range 0, . . . , 51, denoted here by q'. The quantization step doubles for every increment of 6 in q'. Sometimes, it is more convenient to use the quantization step rather than the quantization parameter, computed according to $$q = 0.85 \cdot 2^{\frac{q'-12}{6}}. \qquad (2)$$

In the following, the q and q' are used interchangeably.

Theoretically, optimal resource allocation for a video sequence requires encoding the sequence with different sets of parameters and selecting one achieving the best result. However, such an approach is impossible due to a very large number of possible combinations of parameters, which leads to a prohibitive computational complexity. Suboptimal resource allocation approaches usually try to model some typical behavior of the encoder as function of the encoding parameters. If the model has an analytical expression which can be efficiently computed, the optimization problem can be practically solved using mathematical optimization. However, since the model is only an approximate behavior of the encoder, the parameters selected using it may be suboptimal. The main difference between existing encoders is the decision process carried out by the bitrate controller that produces the encoder control parameters. Usually, the encoder parameters are selected in a way to achieve the best tradeoff between video quality and bitrate of the produced stream. Controllers of this type are referred to as RDO.

Parameters controlled by the bitrate controller typically include: frame type and reference frame or frames if the frame is a P-frame on the sequence level, and macroblock type and quantization parameter for each macroblock on the frame level. For this reason, it is natural and common to distinguish between two levels of bitrate control: sequence- and frame-level. The sequence-level controller is usually responsible for the frame type selection and allocation of the bit budget for the frame, and the frame-level controller is responsible for selection of the quantization parameter for each macroblock within the frame.

In a conventional coding system, the sequence level control is very limited. The frame type of a frame in a sequence is usually based on its order in a GOP according to a predetermined pattern. For example, the IBBPBBP . . . pattern is often used in MPEG standard where B is a bi-directional predicted frame. The GOP may be formed by partitioning the sequence into GOP of fixed size. However, when a scene change is detected, it may trigger the start of a new GOP for better coding efficiency. The bit rate allocated to each frame usually is based on a rate control strategy. Such resource allocation for sequence encoding only exercises limited resource allocation and there is more room to improve. Based on the discussion presented here, there is a need for an optimal resource allocation for video sequence as well as for video frame. The current invention addresses the resource allocation for video sequence.

SUMMARY

The present invention provides an optimal resource allocation for video sequence to achieve the best possible quality within the sequence resource budget.

In an exemplary embodiment of this invention, the encoder provides as the output an action sequence of encoder parameters by selecting the frame type, quantization scale, and encoding complexity of picture to produce an encoded version of the sequence to achieve a minimum sequence cost within the sequence resource budget. Due to the high computational complexity of calculating the resource budget and video quality by actually performing the encoding process, the resource budget and the video quality are all estimated based on respective models. The resource budget used in this invention includes bit rate and encoding time.

The optimal encoding process by selecting all possible combinations of frame type for individual frames of the sequence would require extremely high complexity if exhaustive search is used. The current invention uses a branch and bound algorithm to simplify the search procedure for an optimal decision on frame type of the sequence.

The benefits of the current intention can be easily appreciated by any person skilled in the art of video compression.

BRIEF DESCRIPTION OF THE DRAWINGS

FIG. 1a shows a block diagram of the optimal resource allocation for video content.

FIG. 1b shows a general optimal resource allocation process.

DETAILED DESCRIPTION

Figure 2A:
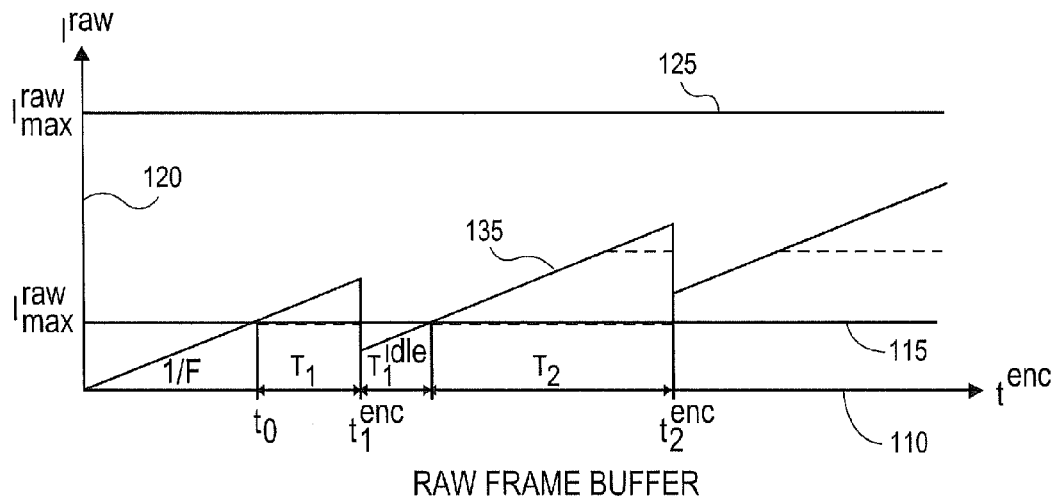
FIG. 2a. Example of buffer model: raw frame buffer.

The invention is directed to a system and method of encoding video sequence, that generally includes providing as the input a video sequence containing pictures as the input, a resource budget for the sequence, and a sequence cost function. The output is an action sequence of encoder parameters configured to produce an encoded version of the sequence to achieve a minimum sequence cost within the sequence resource budget.

In one embodiment, the resource allocation and control mechanism are generic and in principle can be used with any MPEG-type encoder or a similar mechanism. For illustration, in the examples of embodiments below, it is assumed that the underlying encoding pipeline implements the H.264 AVC encoder, with independent slice encoders working simultaneously. Such an implementation is currently typical of real-time hardware encoders.

A system-level block diagram of exemplary controllers configured according to the invention is shown in FIG. 1. On preferred resource allocation process, illustrated as an Optimal Resource Allocation System is shown in FIG. 1a, where a video content and resource/quality constraints are inputs to the system. The video content may be a video sequence, a video frame, a video field, or a partial frame. The video content is fed to Perceptual Quality Model 20 and Visual Clues Computation 40. Perceptual Quality Model derives the parameters of the perceptual quality model based on the input video content. On the other hand, the Visual Clues Computation also derives the visual clues based on input video content. The information from Perceptual Quality Model and the information from the Visual Clues Computation are used to guide partitioning the input video content. The partitioning is based on a unit smaller than the input video content, such as a macroblock, macroblock pair, or block. The partitioning is performed by the Regions Partitioning 30. The smaller unit for the partitioning is named sub-frame. The information from the Visual Clues Computation is used by both the Bit Production Model 50 and PSNR Model 60. Both the Bit Production Model and the PSNR Model are useful for the encoder to evaluate the performance (bit rate and PSNR) without actually going through the computationally heavy encoding process. While the Bit Production is used as a measure of resource, any other resource measurement such as processing time can be used. Similarly, other quality model such as distortion can be used. The Optimal Resource Allocation 10 then exercises optimal resource allocation among the regions using the Bit Production Model, PSNR Model, and Perceptual Quality Model.

The detailed process of the Optimal Resource Allocation 10 is further explained in FIG. 1b. The Video Quality Computation 80 block estimates the video quality of the video data of regions for the set of given encoder parameters instead of actually compress the video data using encoder parameters. The particular video quality computation in this exemplary case is PSNR shaping. The quality estimation is based on the perceptual quality model and PSNR model. The Resource Computation 82 block estimates the resource consumed for the given set of encoder parameters instead of actually compressing the video data. The bit production model is used to estimate the resource consumed. The estimated resource is compared in the compare process "≦Budget?" block 86. If the result is true, the Switch 84 will close to allow the corresponding estimated quality computation pass to the Select Best Quality and Parameters block 88. The Select Best Quality and Parameters block will compare all the video quality results entering the block and will select the best quality value and output the corresponding encoder parameters.

In one embodiment, the system consists of the sequence-level controller, which is responsible for frame type and reference selection and allocation of the bit budget and initial quantization parameter for the currently encoded frame. The frame-level sequence controller allocates the resources on sub-frame level, in order to utilize the total frame bit budget and achieve the highest perceptual visual quality. For this purpose, a perceptual quality model and a PSNR shaping mechanism are employed. Both controllers are based on the encoder model, which predicts the behavior of the encoder given a set of encoding parameters. The model, in turn, utilizes visual clues, a set of descriptors of video data.

The main focuses of the current invention are the encoder models and the sequence-level controller. The most important features of the sequence-level controller include:

A. Content-aware encoder model—an accurate encoder model based on visual clues, allowing optimizing the resource allocation prior to encoding, B. Optimal frame type decision—including IDR insertion at scene cuts, optimization of frame dropping capable of detecting and removing redundant frames, e.g. due to telecine conversion, and optimal reference frame selection based on frame predictability, allowing to achieve compression ratios close to those of codecs using multiple reference frames at significantly lower computational complexity, C. Optimal encoding order decision—allowing out-of-order encoding to achieve better predictability, D. Optimal frame bit allocation, and E. Optimal encoding time allocation, allowing achieving better encoding quality by distributing encoding time between frames according to their coding complexity.

Content-Aware Encoder Model

The purpose of encoder model is to estimate the amount of resources used by the encoder without resorting to the expensive process of encoding itself. Specifically, the amount of bits produced by the encoder, the distortion as the result of encoding and the time complexity of the encoding process are predicted according to the encoder model. The encoder model is disclosed in U.S. patent application Ser. No. 12/040,788, filed Feb. 29, 2008.

In general, if x is the quantity to be predicted (amount of bits, distortion, or time) for the current frame, the predicted value according to the encoder model is computed by $$\hat{x} = K \sum_{i=1}^{N_{MB}} \hat{x}_i(\theta_i; z_i) \qquad (3)$$

where $\hat{x}_i$ is a macroblock-wise predictor, $\theta_i$ are the encoding parameters and $z_i$ are the visual clues in macroblock i, $N_{MB}$ is the number of macroblocks in the frame and K is some normalization factor. Specifically, the following models are used.

Bit Production Model

In each macroblock, the amount of bits produced is proportional to the quantization step $q_i^{-1}$ and to the macroblock complexity $z_i$. Depending on the frame type, either texture (in I-frames) of motion complexity (in P-frames) are used. The macroblock-wise predictor is given by $$\hat{b}_i(q_i, z_i) = \alpha_1 + \alpha_2 z_i q_i^{-1} \qquad (4)$$

where $\alpha 1, \alpha 2 \geq 0$ are the model parameters obtained by training. Assuming that q is constant for the entire frame, the frame-wise predictor of the amount of bits can be therefore expressed as $$\begin{aligned}\hat{b} &= \sum_{i=1}^{N_{MB}} \hat{b}_i(q, z_i) \\ &= N_{MB}\alpha_1 + \sum_{i=1}^{N_{MB}} \alpha_2 z_i q_i^{-1} \\ &= \alpha^b + \beta^b q^{-1}\end{aligned} \qquad (5)$$

where the coefficients $\alpha^b = N_{MB}\alpha_1$ and $\beta^b = \sum_{i=1}^{N_{MB}} \alpha_2 z_i$ depend on the frame content and frame type.

Distortion Model

The luma PSNR is used as an objective distortion criterion. In each macroblock, the PSNR is inversely proportional to the quantization parameter $q_i^{-1}$ and to the macroblock complexity $z_i$ (texture complexity is used for both P- and I-frames).

$$\hat{p}_i(q_i, z_i) = \beta_1 - \beta_2 z_i - \beta_3 q'_i \qquad (6)$$

where $\beta_1, \beta_2, \beta_3 \geq 0$ are the model parameters obtained by training. Assuming that $q'_i$ is constant for the entire frame, the predictor of the frame-wise average PSNR can be therefore expressed as $$\begin{aligned}\hat{p} &= \frac{1}{N_{MB}} \sum_{i=1}^{N_{MB}} \hat{p}_i(q', z_i) \\ &= \beta_1 - \frac{1}{N_{MB}} \sum_{i=1}^{N_{MB}} \beta_2 z_i - \frac{1}{N_{MB}} \sum_{i=1}^{N_{MB}} \beta_3 q' \alpha^P + B^P q'\end{aligned} \qquad (7)$$

where the coefficients $$\alpha^P = \beta_1 - \frac{1}{N_{MB}} \sum_{i=1}^{N_{MB}} \beta_2 z_i$$

and $$\beta^P = -\frac{1}{N_{MB}} \sum_{i=1}^{N_{MB}} \beta_3$$

depend on the frame content and frame type.

Distortion Model for Dropped Frames

In some cases, the sequence-level controller may decide to drop a frame. In such a case, it is assumed that the decoder delays the previous frame for a longer duration, equal to the duration of the previous and current (dropped frame). The distortion due to the drop is computed as the average PSNR between a downsampled (16 times in each axis) version the dropped frame and the previous frame. As an exemplary implementation, the average PSNR is computed by first calculating the average MSE and then converting it into logarithmic scale (rather than averaging the PSNR values directly). For example, dropping a frame at the beginning of a new shot would result in a low PSNR, while dropping a frame in a sequence of frames with slow motion will result in high PSNR. It may appear that though the average PSNR is high, in some small portions of the image the distortion due to frame drop is very large (such a situation is typical for a frame with abrupt motion of a foreground object, while the background is static). In order to take into consideration such situations, together with the average PSNR, we measure the 0:1% lowest quantile of the PSNR values, denoted by $\hat{p}^{min}$.

Time Complexity Model

The underlying assumption of the time complexity model is that the encoding pipeline used to encode a macroblock consists of multiple stages, some of which are bypassed according to the encoded macroblock type using some decision tree. Consequently, it can be simplistically assumed that encoding a macroblock of certain type takes a fixed amount of time. Let $c_T$ denote the maximum amount of time it takes to encode a macroblock (nominal encoding time), which depends on the frame type and on the complexity scale c'. Let's denote $\tau'$ the fraction of $c_T$ is takes to encoder macroblock i, the time used to encode a macroblock is $\tau_i = cT\tau'_i$. According to the model, the normalized encoding time for macroblock i is given by $$\hat{\tau}_i(q_i, z_i) = \max\{\min\{\gamma_1 + \gamma_2 z_i - \gamma_3 q'_i, 1\}, 0\} T \quad (8)$$

where $\gamma_1, \gamma_2, \gamma_3 \geq 0$ are the model parameters obtained by training, and $z_i$ and q' are the texture complexity (for I-frames) and motion complexity (for P-frames) respectively. The minimum and maximum is taken in order to ensure that the predicted normalized time value is within a valid range of [0,T] (for a reasonable range of $z_i$ and q', this assumption will hold). Assuming that q' is constant for the entire frame, the predictor of the encoding time for the entire frame is approximated (neglecting the possible nonlinearity due to the minimum and maximum functions) as $$\hat{\tau} \approx \sum_{i=1}^{N_{MB}} \hat{\tau}'_i(q', z_i)c = N_{MB}\gamma_1 cT - \sum_{i=1}^{N_{MB}} \gamma_2 z_i cT - N_{MB}\beta_3 cTq' \quad (9)$$

where the coefficients $$\alpha^t = N_{MB}\gamma_1 cT - \sum_{l=1}^{N_{MB}} \gamma_2 z_i T \text{ and } \beta^t = -N_{MB}\beta_3 T$$

depend on the frame content and frame type.

Buffer Models

The purpose of the buffer models is to provide a simple means of modeling the encoder input and output as well as the hypothetic decoder input behavior, imposing constrains in bit and time allocation. The encoder model comprises a raw frame buffer constituting the input of the system to which raw frames are written, and the encoder bit buffer, constituting the output of the system, to which the encoded bitstream is written. The hypothetic decoder model comprises a decoder bit buffer, connected to the encoder bit buffer by a channel responsible for the transport of the coded stream.

Raw Frame Buffer Model

The e fullness of the raw frame buffer at time t is denoted by $l^{raw}(t)$. We assume that initially $l^{raw}(0)=0$, and raw frames are being filled at constant time intervals of 1/F, where F denotes the input sequence frame rate. Though $l^{raw}$ may assume integer values only, in most parts of our treatment we will relax this restriction treating $l^{raw}$ as a continuous quantity. The encoder starts reading the first frame from the raw buffer as soon as the raw buffer level reaches. $l^{raw} \geq l_{min}^{raw}$ where $l_{min}^{raw} \geq 1$ denotes the minimum amount of look-ahead required by the encoder in the current implementation. The first frame in the sequence starts being encoded at the time $$t_0 = \frac{l_{min}^{raw}}{F} \quad (10)$$

The encoding of the first frame takes $\tau_1$ seconds, after which the frame is removed from the raw buffer, decreasing its level by 1. The moment this happens is the encoding end time, denoted by $$t_1^{enc} = t_0 + \tau_1 \quad (11)$$

If $l^{raw}(t_n^{enc} + \epsilon) < l_{min}^{raw}$, for infinitesimal $\epsilon > 0$, encoder raw buffer underflow occurs; in this case the encoder will stall until the minimum buffer level is reached. We denote this idle time by $$\tau_1^{idle} = \frac{l_{min}^{raw} - l^{raw}(t_1^{enc})}{F} \quad (12)$$

In this notation, the encoding of the next frame will start at time $t_1^{enc} + t_1^{idle} = t_0 + \tau_1 + \tau_1^{idle}$. The raw frame buffer is assumed to be capable of holding up to $l_{max}^{raw}$ raw frames; when the buffer capacity reaches this limit, an encoder raw buffer overflow occurs, and the input process stalls. Whenever the duration of such a stall is not negligible, input data may be lost.

The buffer level has to be checked for overflow immediately before the encoder finishes encoding a frame, and for underflow immediately before the encoder starts encoding a frame. Combining the contributions of frame production by the input subsystem and consumption by the encoder, the raw frame buffer levels are given by $$l^{raw}(t_n^{enc}-\epsilon)=t_n^{enc}F-n+1. \quad (13)$$

The raw frame buffer model is shown in FIG. 2a, where the horizontal axis 110 is the encoding time index and the vertical axis 120 is the raw frame buffer level. The minimum buffer level 115 and the maximum buffer level 125 are the upper and lower bounds of the raw frame buffer levels that the system desires to maintain. The raw frame buffer profile 135 is the achieved dynamic raw frame buffer level in this exemplary case.

Encoder Bit Buffer Model

The fullness of the encoder bit buffer at time t is denoted by $l^{enc}(t)$ We assume that initially $l^{enc}(0)=0$ and at the time $t_n^{enc}$ when the encoder completes encoding frame n, $b_n$ bits corresponding to the access unit of the coded frame are added to the buffer. After the first time the buffer level exceeds $l_{init}^{enc}$ the buffer starts being drained at a rate $r(t) \leq r_{max}(t)$, determined by the transport subsystem. If at a given time the buffer is empty, the instantaneous draining rate drops to $r(t)=0$. This situation is referred to as encoder bit buffer underflow. Except for inefficiency of utilizing the full channel capacity, encoder buffer underflow poses no danger to the system. The complement situation of encoder bit buffer overflow occurs when $l^{enc}(t_n^{enc})+b_n \geq l_{tot}^{enc}$. As a consequence, the encoder will stall until the bit buffer contains enough space to accommodate the encoded bits. If the stall lasts for a non-negligible amount of time, unpredictable results (including input raw frame buffer overflow) may occur.

The buffer level has to be checked for undertow immediately before the encoder finishes encoding a frame, and for overflow immediately after the encoding is finished. Combining the contributions of bit production by the encoder and consumption by the transport subsystem, the encoder bit buffer levels are given by $$l^{enc}(t_n^{enc} - \epsilon) = l^{enc}(t_{n-1}^{enc} + \epsilon) - \int_{t_{n-1}^{enc}}^{t_n^{enc}} r(t)dt \quad (14)$$

$$l^{enc}(t_n^{enc} + \epsilon) = l^{enc}(t_{n-1}^{enc} - \epsilon) + b_n. \quad (15)$$

Figure 2B:
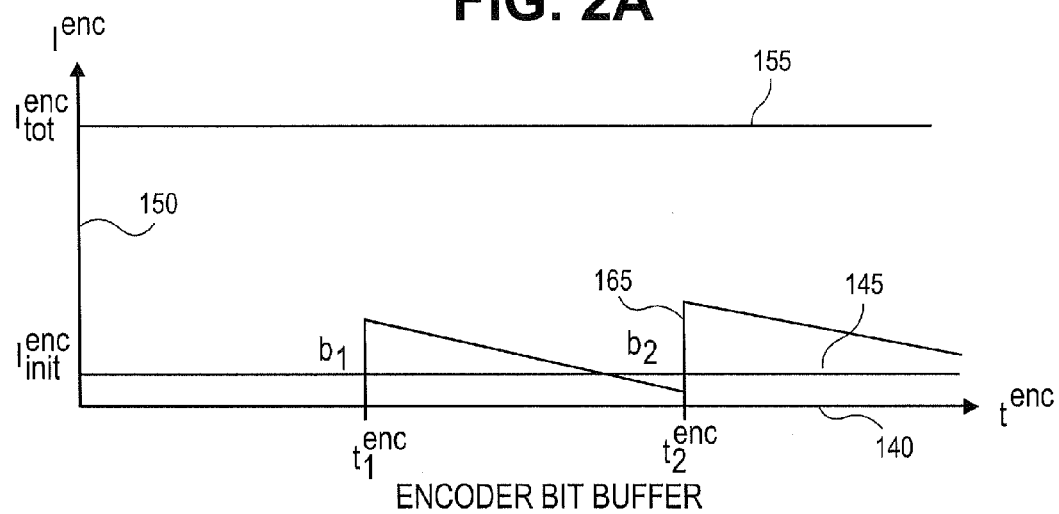
FIG. 2b. Example of buffer model: encoder bit buffer.

The encoder bit buffer model is shown in FIG. 2b, where the horizontal axis 140 is the encoding time index and the vertical axis 150 is the encoder bit buffer level. The minimum buffer level 145 and the maximum buffer level 155 are the upper and lower bounds of the encoder bit buffer levels that the system desires to maintain. The encoder bit buffer profile 165 is the achieved encoder bit buffer level in this exemplary case. For convenience, let us denote by $$r_n = \frac{1}{t_n^{enc} - t_{n-1}^{enc}} \int_{t_{n-1}^{enc}}^{t_n^{enc}} r(t)dt \quad (16)$$

the average rate while the frame n being encoded. Assuming that $r(t)=r_{max}(t)$ if $l^{enc}(t)>0$, and $r(t)=0$ otherwise, we obtain $$r_n = \frac{1}{t_n^{enc} - t_{n-1}^{enc}} \min\left\{l^{enc}(t_{n-1}^{enc} + \epsilon), \int_{t_{n-1}^{enc}}^{t_n^{enc}} r_{max}(t)dt\right\}. \quad (17)$$

In these terms, we may write $$l^{enc}(t_n^{enc}-\epsilon)=l^{enc}(t_{n-1}^{enc}+\epsilon)-(t_n^{enc}-t_{n-1}^{enc})r_n \quad (18)$$

Decoder Bit Buffer Model

Bits drained from the encoder bit buffer at time t at rate $r(t)$ are transported by the channel and are appended to the decoder bit buffer at time $t=\delta_{chan}$ at the same rate. The channel delay $\delta_{chan}$ needs not to be constant; in this case, maximum channel delay may be assumed. The fullness of the decoder bit buffer at time t is denoted by $l^{dec}(t)$. Initially, $l^{dec}(0)=0$; the buffer level remains zero until $t=t_1^{enc}+\delta_{chan}$, where the first bits of the first frame start arriving. The decoder remains idle until $l^{dec} \geq l_{init}^{dec}$; once the bit buffer is sufficiently full, the decoder removes b1 bits from the buffer and starts decoding the first frame of the sequence. The time lapsing between the arrivals of the first bit until the first access unit is removed from the bit buffer is given by the smallest $\delta_{dec}$ satisfying $$\int_{t_1^{enc}}^{t_1^{enc}+\delta_{dec}} r(t')dt' \geq l_{init}^{dec}. \quad (19)$$

We denote by $$t_1^{dec}=t_1^{enc}+\delta_{chan}+\delta_{dec} \quad (20)$$

the time when the first frame starts being decoded The delay passing between production and consumption of the access unit corresponding to a frame is denoted by $$\delta=\delta_{chan}+\delta_{dec} \quad (21)$$

The decoder removes access units corresponding to the encoded frames at a constant rate F, resulting in the following decoding schedule $$t_n^{dec} = t_1^{dec} + \frac{n-1}{F}. \quad (22)$$

The decoder bit buffer level assumes highest and lowest values immediately before frame decoding start, and immediately after the decoding is started, respectively. Combining the contributions of bit production by the transport subsystem and consumption by the decoder, the decoder bit buffer levels are given by $$l^{dec}(t_n^{dec} - \epsilon) = l^{dec}(t_{n-1}^{dec} + \epsilon) - \int_{t_{n-1}^{dec}+\delta}^{t_n^{dec}+\delta} r(t)dt \quad (23)$$

$$l^{dec}(t_n^{dec} - \epsilon) = l^{dec}(t_{n-1}^{dec} - \epsilon) - b_n. \quad (24)$$

Figure 2C:
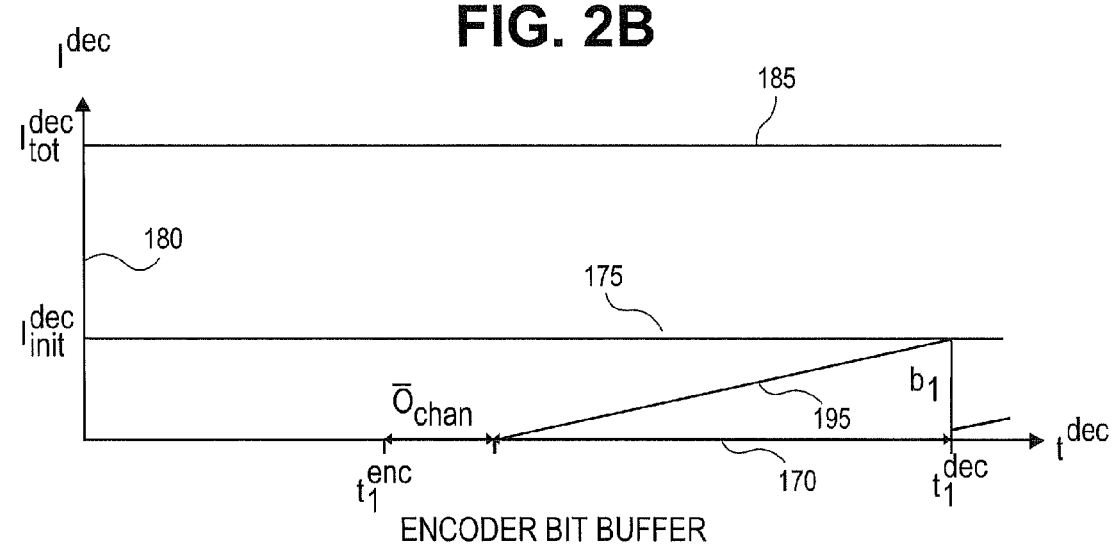
FIG. 2c. Example of buffer model: decoder bit buffer.

The decoder bit buffer model is shown in FIG. 2c, where the horizontal axis is the encoding time index 170 and the vertical axis is the decoder bit buffer level 180. The minimum buffer level 175 and the maximum buffer level 185 are the upper and lower bounds of the decoder bit buffer levels that the system desires to maintain. The decoder bit buffer profile 195 is the achieved decoder bit buffer level in this exemplary case.

Sequence Resource Allocation

Assuming that the encoder is encoding an i-th frame in the current GOP, and is capable of observing n−1 additional future frames i+1, . . . , i+n−1 queued in the raw input buffer, the problem of sequence resource allocation consists of establishing a resource budget for the latter sequence of n frames.

Here, allocation of bit and encoding time budgets, denoted by $b_T$ and $\tau_T$, respectively are considered. The display time stamp relative to the beginning of the current GOP of the i-th frame is denoted by $t_i$. Assuming an estimate $\hat{\delta}$ of the decoder delay is available and denoted by $$t_{max} = \max\{t_{max}^{gop}, \hat{\delta}\} \quad (25)$$

The maximum GOP duration (if the duration is smaller than the estimated delay, $t_{max} = \hat{\delta}$ is used). The minimum GOP duration is set to the minimum temporal distance between two consecutive IDR frames, $$t_{min} = t_{min}^{idr}. \quad (26)$$

The maximum amount of time remaining till the GOP end is denoted by $$t_{rem} = t_{max} - t_i, \quad (27)$$

from where the number of remaining frames, $$n_{rem} = t_{rem} F \quad (28)$$

is obtained.

Figure 3:
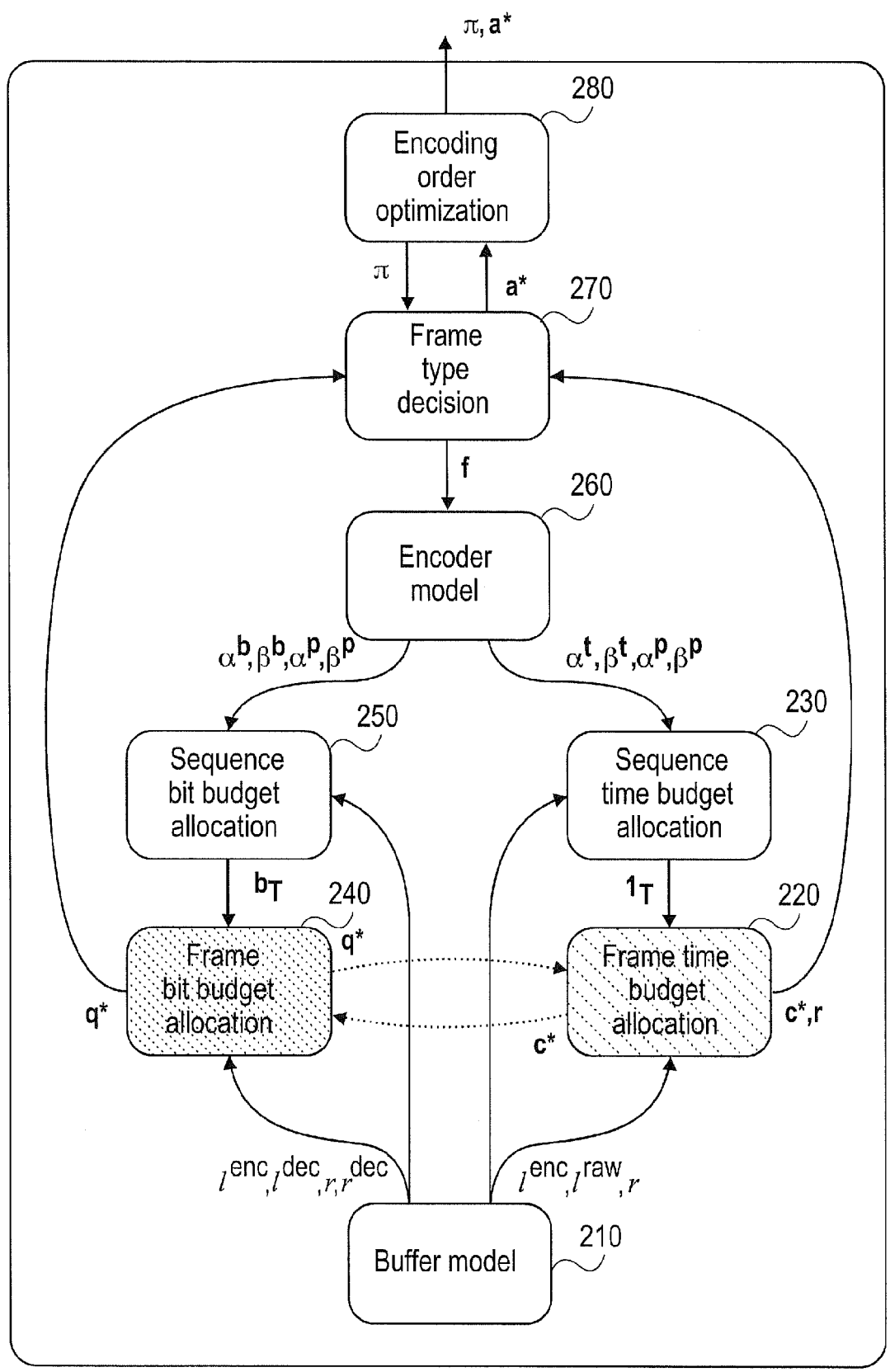
FIG. 3. Sequence-level controller flow diagram.

The sequence-level controller flow diagram is shown in FIG. 3 where the Frame Type Decision 270 and Encoding Order Optimization 280 are the system design parameters that the sequence-level controller will produce to achieve the minimum sequence cost within the sequence budget. The Buffer Model 210 will extract buffer model for the raw frame buffer, encoder bit buffer and decoder bit buffer. On the other hand, the Encoder Model 260 acts on the frame decision f from Frame Type Decision 270 and the underlying sequence to produce parameters for encoder model. The encoder model with the associated parameters allow the system to evaluate the corresponding system cost and quality without actually performing the computationally expensive encoding process. The system costs described in FIG. 3 are bit budget and time budget. Nevertheless, other system costs can also be used by people skilled in the field. The Sequence Bit Budget Allocation 250 allocates the frame bit rate budget using the results from Encoder Model 260 and Buffer Model 210 to avoid the complexity associated with actually encoding process. Similarly, the Sequence Time Budget Allocation 230 allocates the frame time budget using the results from Encoder Model 260 and Buffer Model 210 to avoid the complexity associated with actually encoding process. Based on the frame bit budget by, the Frame Bit Budget Allocation 240 performs optimal bit budget allocation within the frame. The frame bit budget allocation is typically done on a smaller picture unit such as macroblock or block by assigning a proper quantization level. The Frame Time Budget Allocation 220 works in a similar way to that as Frame Bit Budget Allocation 240.

Effective Bit Rate Estimation

The estimated rate, $\hat{r}^{dec}$ at the decoder at the time when the i-th frame will be decoded is approximated by $$\hat{r}^{dec} \approx r(t^{enc} + \delta), \quad (29)$$

where r is the current rate. Assuming the simplistic model of the rate remaining constant r in the interval $[t^{enc}, t^{enc}+\delta]$, and then remaining constant $\hat{r}^{dec}$, the average bit rate of the encoder buffer drain in the interval $[t^{enc}, t^{enc}+t_{max}]$ is given by $$r^{enc} = \hat{\delta} r + \frac{(t_{max} - \hat{\delta}) \hat{r}^{dec}}{t_{max}}. \quad (30)$$

Under the assumption of nearly constant channel rate, the encoder and decoder bit buffers remain synchronized (up to an initial transient), connected by the relation $$l^{enc}(t) + l^{dec}(t+\delta) = l_{tot}^{enc}. \quad (31)$$

However, bit rate fluctuations result in a loss of such synchronization. For example, in the case of a future decrease in the channel capacity ($\hat{r}^{dec} < r$), encoding the next frames at the rate r will cause the decoder buffer level to drop and, eventually, to underflow, while keeping the encoder buffer level balanced. In the converse case of a future increase in the channel capacity ($\hat{r}^{dec} > r$) keeping the video stream rate at r will result in a decoder bit buffer overflow.

A solution proposed here consists of modifying the rate at which the stream is encoded such that both buffers remain as balanced as possible. We refer to such a modified rate as to the effective bit rate, $$r_{eff} = \max\{\min\{0.5(r^{enc} + \hat{r}_{dec}) + \Delta r, \max\{r^{enc}, \hat{r}^{dec}\}\}, \min\{r^{enc}, \hat{r}^{dec}\}\}, \quad (32)$$

where $$\Delta r = \frac{1}{2 t_{max}} \begin{cases} \hat{l}^{dec} - l^{enc} + l_{min}^{enc} - l_{min}^{dec} : \hat{r}^{dec} \geq r \\ l_{max}^{dec} - l_{max}^{enc} - l^{enc} + \hat{l}^{dec} : \hat{r}^{dec} < r \end{cases} \quad (33)$$

Using $r_{eff}$ instead of r in the first example will cause both encoder and decoder buffer levels to drop by a less extent Bit Budget Allocation Given an estimated effective encoding bit rate $r_{eff}$, the amount of bit budget remaining till the end of the GOP is given by $$b_{rem} = r_{eff} t_{rem}. \quad (34)$$

According to the bit production model (6), the estimated amount of bits generated by the encoder for an i-th frame given a quantizer $q_i$ is given by $$\hat{b}_i = \alpha_i^b + \frac{\beta_i^b}{q_i} \quad (35)$$

where the coefficients $\alpha^b = (\alpha_1^b, \ldots, \alpha^b)^T$ and $\beta^b = (\beta_1^b, \ldots, \beta^b)^T$ depend on the frame content and frame type fi. The latter is assumed to be assigned by a higher-level frame type decision algorithm and $$\alpha^b = \sum_{i=1}^{n} \alpha_i^b \quad (36)$$

$$\beta^b = \sum_{i=1}^{n} \beta_i^b$$

denote the sum of the model coefficients of the observed n frames. Substituting $\alpha^b$ and $\beta^b$ into the bit production model yields the total estimate of bits produced by encoding the observed frames i, ..., i+n−1 with a constant quantizer. Similarly, we denote by $$\alpha_{rem}^b = (n_{rem} - n)\overline{\alpha}^b$$

$$\beta_{rem}^b = (n_{rem} - n)\overline{\beta}^b \quad (37)$$

the model coefficients for estimating the amount of bits of the remaining frames in the current GOP; $\overline{\alpha}^b$ and $\overline{\beta}^b$ are decaying moving averages of $\alpha_i^b$ and $\beta_i^b$ respectively, of the previously encoded frames.

The goal of sequence bit budget allocation is to maintain a fair distribution of the encoding bits throughout the sequence, considering the long-term effect of the decided allocation, as well as reacting to changes in channel bit rate and frame texture and motion complexity. Under the simplifying assumption that at the sequence level the visual quality is a function of the quantizer only, not depending on the frame content, the problem of sequence bit budget allocation can be translated to finding a single quantization scale q, which assigned to the remainder of the GOP frames produces $b_{rem}$ bits. Substituting the appropriate bit production models.

$$\alpha^b + \alpha_{rem}^b + (\beta^b + \beta_{rem}^b)\frac{1}{q} = b_{rem} \quad (38)$$

and solving for 1/q yields, $$\frac{1}{q} = \frac{b_{rem} - \alpha^b + \alpha_{rem}^b}{\beta^b + \beta_{rem}^b} \quad (39)$$

Substituting the latter result into the bit production model yields the following bit budget for the sequence of the observed n frames.

$$b_T' = s \cdot \begin{cases} \alpha^b + \beta^b \cdot \frac{b_{rem} - \alpha^b + \alpha_{rem}^b}{\beta^b + \beta_{rem}^b} & : \beta^b + \beta_{rem}^b > 0 \\ \frac{b_{rem}}{n_{rem}} & : \text{else,} \end{cases} \quad (40)$$

Where, $$s = \frac{l_{tot}^{dec} + \left(\frac{\epsilon_1}{h} - \epsilon_1 - 1\right)\hat{l}^{dec}}{l_{tot}^{dec} + \left(\frac{1}{h} - \epsilon_1 - 1\right)\hat{l}^{dec}} \quad (41)$$

is a scaling factor decreasing the bit budget for higher, and increasing for lower decoder bit buffer levels, respectively; $\hat{l}^{dec} = \hat{l}^{dec}(t_i^{dec} - \epsilon)$ is the estimated decoder bit buffer fullness immediately prior to decoding the i-th frame, $\epsilon_{1=3}$, and h is the target relative decoder bit buffer level, defined as $$h = \max\left\{\min\left\{0.5 + .01\frac{t_i - t_{min}}{t_{max} - t_{min}^{idr}} + t_{max}\frac{\hat{r}^{dec} - r_{eff}}{t_{tot}^{dec}}, 0.6\right\}, 0.4\right\} \quad (42)$$

To guarantee some level of bit allocation fairness, the budget is constrained to be within 25% to 200% of the average bit budget, $$\overline{b}_T = \frac{n r_{eff}}{F} \quad (43)$$

resulting in $$b_T' = \min\{\max\{b_T', 0.25\overline{b}_T\}, 2\overline{b}_T\} \quad (44)$$

Encoder and decoder bit buffer constrains are further imposed, yielding the following final expression for the sequence bit budget $$b_T = \min\left\{\min\left\{b_T^n, l_{max}^{enc} - l^{enc} + \frac{nr}{F}\right\}, \hat{l}^{dec} + \frac{n\hat{r}^{dec}}{F} - l_{min}^{dec}\right\} \quad (45)$$

where $l^{enc}$ enc is the encoder bit buffer level immediately prior to encoding the i-th frame.

Encoding Time Budget Allocation

Similar to the bit budget allocation, the time budget allocation problem consists of assigning the target encoding time $\tau_T$ for the observed frames n. However, due to the stricter constrains imposed by the encoder raw frame buffer, encoding time allocation operates with shorter terms. Since frames are added to the encoder input buffer at the rate of F frames per second, the average encoding time of a frame is 1/F, resulting in the average budget $$\overline{\tau}_T = \frac{n}{F} \quad (46)$$

for the sequence of n observed frames. Using this budget and assuming the encoder has encoded $n_{enc}$ frames so far (including the dropped ones), the time at the encoder should be $n_{enc}/F$. However, since the actual encoding time may differ from the allocated budget, the time at the encoder immediately prior to encoding the i-th frame (relative to the time $t_0$ when the first frame in the sequence starts being encoded) usually differs from the ideal value. We denote by $$t_{dif} = \frac{n_{enc}}{F} - t^{enc} - t_0 \quad (47)$$

the time difference between the ideal and actual encoding time; if $t_{dif} > 0$ the encoder is faster than the input raw frame rate and the encoding time budget has to be increased in order to avoid raw buffer underflow. Similarly, if $t_{dif} < 0$, the encoder is lagging behind the input and the time budget has to be decreased in order to prevent an overflow. Demanding the encoder to close the time gap in $n_{resp}$ frames ($n_{res}/F$ seconds), yields the following encoding time budget $$\tau' = \overline{\tau}_T + \frac{n t_{dif}}{n_{resp}} \quad (48)$$

Typically, $n_{resp} \approx 5$, depending on $l_{max}^{raw}$. To guarantee some level of fairness, the budget is constrained by $$\tau_T'' = \max\{\min\{\tau_T', 1.5\overline{\tau}_T\}, 0.75\overline{\tau}_T\} \quad (49)$$

Encoder bit buffer constrains are further imposed yielding the final encoding time budget $$\tau_T = \max\{\min\{\tau_T'', \tau_{max}\}, \tau_{min}\}, \quad (50)$$

where $$\tau_{min} = \frac{l^{enc} + \sum_{i=1}^{n-1} \hat{b}_i - l_{max}^{enc}}{r} \quad (51)$$

$$\tau_{max} = \max\left\{ \frac{l^{enc} + \sum_{i=1}^{n-1} \hat{b}_i - l_{min}^{enc}}{r}, \tau_{min} \right\}$$

and $\hat{b}_i$ are the expected bits produced by encoding the i-th frame. Due to the dependence on $\hat{b}_i$, the time allocation must be preceded by bit allocation.

Frame Resource Allocation

The problem of frame resource allocation consists of distributing a given budget of resources between n frames in a sequence. More formally, we say that the vector $x=(x1, \ldots, xn)^T$ is an allocation of a resource x, where each xi quantifies the amount of that resource allocated to the frame i. For example, x can represent the amount of coded bits or encoding time. Ideally, we would like to maximize the xi for each frame; however, the allocation has to satisfy some constrains, one of which is $$\sum_{i=1}^{n} x_i = x_T \quad (52)$$

where xT is the resource budget assigned to the sequence by a higher-level sequence resource allocation algorithm. Other constrains stemming, for example, from the encoder buffer conditions apply as well. Formally, we say that an allocation vector x is feasible if it satisfies that set of conditions, and infeasible otherwise. Resource allocation can be therefore thought of as finding a feasible solution to the maximization problem.

$$\max_{x} x \text{ s.t. } x \text{ is feasible} \quad (53)$$

Since usually the encoder is controlled using a set of parameters different from the allocated resource itself (e.g., though coded bits are allocated as a resource, the amount of produced bits is controlled through the quantization parameter), it is more convenient to express x as a function of some vector of parameters $\theta=(\theta 1, \ldots, \theta m)^T$. This yields the following optimization problem $$\max_{\theta} x(\theta) \text{ s.t. } x(\theta) \text{ is feasible.} \quad (54)$$

Note, however, that since the maximized objective is a vector rather than a scalar quantity, there exists no unique way to define what is meant by "maximum x". Here, we adopt the following notion of vector objective optimality.

Definition 1 (Max-min optimality) A vector of resources $x=(x1, \ldots, xn)^T$ is said to be max-min optimal if it is feasible, and for any $1 \leq i \leq n$ and a feasible $y=(y1, \ldots, yn)$ for which $xp < yp$, there is some j with $xi \geq yj$ and $xj > yj$.

Informally, this means that it is impossible to increase the resource allocated to a frame i without decreasing the resources allocated to frames that have already a smaller resource allocation than xi, and without violating the feasibility constrains. For this reason, a max-min optimal resource allocation can be thought of as fair. As to notation, given the vector of resources x as a function of some parameters $\theta$ and feasibility constraints $\theta \in \Omega$, we will henceforth interpret the vector objective maximization problem.

$$\theta^* = \underset{\theta \in \Omega}{\operatorname{argmax}} \, x(\theta), \quad (55)$$

as finding a max-min optimal resource allocation $x^*=x(\theta^*)$. In the remainder of this section, we are going to explore and formulate allocation problems for two types of resources considered here, namely coded bits and encoding time.

Bit Allocation

The first problem we are going to address is the distribution of the budget of bT bits between the frames, which can be denoted as a bit allocation vector $b=(b1, \ldots, bn)^T$. However, since the encoder is not controlled directly by b, but rather by the quantizer value, we reformulate the problem as allocating a vector $q=(q1, \ldots, qn)^T$ of quantizer scales (or, equivalently, a vector q' of quantization parameters). Though q and q' may assume only discrete values, we relax this restriction by making them continuous variables. In these terms, the quantizer allocation problem can be formulated as max-min allocation of coding quality, in our case, average frame PSNR values $p=(p1, \ldots, pn)^T$, as function of q and subject to feasibility constraints, $$\max_{q} p(q) \text{ s.t. } b(q) \text{ is feasible.} \quad (56)$$

Note that the feasibility constrains are imposed on the amount of bits produced by the encoder with the control sequence q. Since in practice the exact amount of bits produced for a given quantizer is unknown a priori, b(q) has to be substituted with the estimated coded bits $\hat{b}(q)$. Such an estimate depends on the frame types, which are assumed to be decided by a higher-level frame type decision algorithm, detailed in the sequel. One of the feasibility constraints is, clearly, $\hat{b}(q)=bT$. However, this condition is insufficient, as it may happen that the produced bits violate the buffer constrains for a frame i<n. In order to formulate the buffer constrains on the allocated bits, let us denote by $t^{dec}=(t_1^{dec}, \ldots t_n^{dec})^T$ the decoding timestamps of the frames, assuming without loss of generality that t1=0 and that the frames are numbered in the increasing order of ti. We denote the estimated decoder bit buffer fullness immediately before and immediately after frame i is decoded by $\hat{l}_-^{dec}(q)=l_0^{dec}(t_i^{dec}-\epsilon)$ and $\hat{l}_+^{dec}(q)=l_0^{dec}(t_i^{dec}+\epsilon)$, respectively. We assume that the initial decoder buffer fullness $\hat{l}_-^{dec}=\hat{l}_0^{dec}$ is given as the input. In vector notation, we can write $$\hat{l}_-^{dec}(q) = l_0^{dec} - K\hat{b}(q) + \hat{r}^{dec}t^{dec} \quad (57)$$

$$\hat{l}_+^{dec}(q) = l_0^{dec} - J\hat{b}(q) + \hat{r}^{dec}t^{dec} \quad (58)$$

where $$J = \begin{pmatrix} 1 & 0 & \cdots & 0 \\ 1 & 1 & \cdots & 0 \\ \vdots & \vdots & \ddots & \vdots \\ 1 & 1 & \cdots & 1 \end{pmatrix} \quad (59)$$

K=J−I, and $\hat{r}^{dec}$ is the estimated average decoder bit buffer filling rate on the time interval $$\left[t_1, t_n + \frac{1}{F}\right].$$

The constrained optimal allocation problem becomes $$\max_{q_{min} \leq q \leq q_{max}} p(q) \text{ s.t.} \begin{cases} 1^T \hat{b}(q) = b_T \\ \hat{l}_-^{dec}(q) \leq l_{max}^{dec} \\ \hat{l}_+^{dec}(q) \geq l_{min}^{dec}, \end{cases} \quad (60)$$

where $l_{min}^{dec}$ and $l_{max}^{dec}$ are the minimum and the maximum decoder big buffer levels, respectively. Since it is reasonable to assume a monotonically decreasing dependence of the PSNR in the quantization parameter (or the quantizer scale), the maximizer of (60) coincides with the minimizer of $$\max_{q_{min} \leq q \leq q_{max}} q \text{ s.t.} \begin{cases} 1^T \hat{b}(q) = b_T \\ \hat{l}_-^{dec}(q) \leq l_{max}^{dec} \\ \hat{l}_+^{dec}(q) \geq l_{min}^{dec}, \end{cases} \quad (61)$$

A numerical solution of the max-min allocation problem (61) can be carried out using a variant of the bottleneck link algorithm, summarized in Algorithm 1. In the algorithm, we assume that the amount of coded bits produced for a frame i as a function of qi is given by the model $$\hat{b}_i = \alpha_i^b + \frac{\beta_i^b}{q_i} \quad (62)$$

where the coefficients $\alpha^b = (\alpha_1^b, \ldots, \alpha_n^b)^T$ and $\beta^b = (\beta_1^b, \ldots, \beta_n^b)^T$ depend on the frame content and frame types. In vector notation, this yields $$\hat{b} = \alpha^b + \frac{\beta^b}{q} \quad (63)$$

where vector division is interpreted as an element-wise operation. The algorithm can be easily adopted to other models as well by replacing the closed-form solution in Steps 1, 8, and 9 with the more general equation $$b_T = \sum_{i=1}^n \hat{b}_i(q) \quad (64)$$

with respect to the scalar q.

---

Algorithm 1: Max-min frame bit allocation input: n × 1 vectors $\alpha^b$, $\beta^b$ of bit model parameters; n × 1 vector of decoding time stamps $t^{dec}$ starting with $t_1^{dec} = 0$; initial decoder bit buffer level $l_0^{dec}$ bit budget bT; estimated average decoder buffer rate $\hat{r}^{dec}$ output: n × 1 optimal max-min quantizer allocation vector q*.

1     Find optimal equal quantizer allocation $$q = \max\left\{\min\left\{\frac{1^T \beta^B}{b_T - 1^T \alpha^b}, q_{max}\right\}, q_{min}\right\}$$

and set q = q · 1

2     if $\hat{l}_-^{dec}(q) \leq l_{max}^{dec}$ and $\hat{l}_+^{dec}(q) \geq l_{max}^{dec}$ then 3        set q* = q.

4     else

5        Find the smallest 1 ≤ m ≤ n for which one of the constrains is violated.

6        if $\hat{l}_{min-}^{dec}(q) \leq l_{max}^{dec}$ then set $b_T^0 = l_0^{dec} + \hat{r}^{dec} t_{m+1}^{dec} - l_{max}^{dec}$ else set $b_T^0 = l_0^{dec} + \hat{r}^{dec} t_m^{dec} - l_{min}^{dec}$.

7        Set $b_T^0 = \max\{b_T^0, 0\}$

8        Find $$q = \max\left\{\min\left\{\frac{1^T (\beta_1^b, \ldots \beta_m^b)^T}{b_T^0 - 1^T (\alpha_1^b, \ldots, \alpha_m^b)^T}, q_{max}\right\}, q_{min}\right\}$$

and set $q_1^* = \ldots = q_m^* = q$

9        Compute remaining bit budget $$b_T = \max\left\{b_T - 1^T (\alpha_1^b, \ldots, \alpha_m^b)^T - \frac{1}{q} 1^T (\beta_1^b, \ldots \beta_m^b)^T, 0\right\}$$

10       Recursively invoke the algorithm with $\alpha = (\alpha_{m+1}^b, \ldots, \alpha_{n+1}^b)^T$, $t^{dec} = (t_{m+1}^{dec}, \ldots, t_n^{dec})^T - t_{m+1}^{dec}$, and $l_0^{dec} = l_0^{dec} - b_T^0 \hat{r}^{dec} t_{m+1}^{dec}$ to fix the remaining quantizer values $(q_{m+1}^*, \ldots, q_n^*)$ 11 end Encoding Time Allocation The second problem we are going to address is the allocation of the encoding time budget $\tau T$ between the frames, which can be denoted as an encoding time allocation vector $\tau = (\tau 1, \ldots, \tau n)^T$. As in the case of bit allocation, since the encoder is not controlled directly by $\tau$, but rather by the complexity scale, we reformulate the problem as allocating a vector $c = (c1, \ldots, cn)^T$ of complexity scales. Again, we think of c as of a continuous variable, though in practice it may be restricted to a set of discrete values. We denote by $\hat{t}^{enc} = (\hat{t}_1^{enc}, \ldots, \hat{t}_n^{enc})^T$ the time at which frame i's encoding is complete, assuming without loss of generality that the first frame starts being encoded at time 0. Furthermore, we assume that the encoding time for a frame i coincides with the encoding start time for the frame i+1. In this notation, $$\hat{t}^{enc} = \hat{f}\hat{\tau}(c) \tag{65}$$

where $\hat{\tau} = (\hat{\tau}1, \ldots, \hat{\tau}n)^T$ denotes the estimated encoding times.

Assuming the quantizer allocation has fixed the estimated amount of bits $\hat{b}$ produced by encoding each frame, our goal is to maximize the coding quality $p(c)$ subject to the encoder buffer constrains. The encoder buffer constrains include both the encoder bit buffer constrains, applying to the output bit buffer, and the encoder raw buffer constrains, applying to the input raw frame buffer. Similar to the bit allocation problem, we denote the estimated encoder bit buffer fullness immediately before and immediately after frame i's encoding is complete by $\hat{l}_{i-}^{enc} = \hat{l}^{enc}(\hat{t}_i^{enc} - \epsilon)$ and $\hat{l}_{i+}^{enc} = \hat{l}^{enc}(\hat{t}_i^{enc} + \epsilon)$, respectively. The initial buffer level $l_0^{enc} = \hat{l}^{enc}(0)$ is assumed to be known from a direct observation. Using this notation, the buffer levels are given by $$\hat{l}_-^{enc}(c) = l_0^{enc} + K\hat{b} - r\hat{f}\hat{\tau}(c) \tag{66}$$

$$\hat{l}_+^{enc}(c) = l_0^{enc} + J\hat{b} - r\hat{f}\hat{\tau}(c) \tag{67}$$

In the same manner, $\hat{l}_{i-}^{raw}$ and $\hat{l}_{i+}^{raw}$ denote the estimated encoder raw frame buffer fullness immediately before and immediately after frame i's encoding is complete. The initial buffer level at time 0 is denoted by $l_0^{raw}$ and is available from a direct observation. Since the filling rate of the input buffer is F, we have $$\hat{l}^{raw}(\hat{t}_i^{enc} - \epsilon) = l_0^{raw} + \hat{t}_i^{enc} F - (i-1) \tag{68}$$

and $\hat{l}^{raw}(\hat{t}_i^{enc} + \epsilon) = \hat{l}^{raw}(\hat{t}_i^{enc} - \epsilon) - 1$. In vector form, this yields $$\hat{l}_-^{raw}(c) = l_0^{raw} + F\hat{f}\hat{\tau}(c) - K1 \tag{69}$$

$$\hat{l}_+^{raw}(c) = l_0^{raw} + F\hat{f}\hat{\tau}(c) - J1 \tag{70}$$

The buffer-constrained encoding complexity allocation problem can be expressed as $$\max_{c_{min} \leq c \leq c_{max}} c \text{ s.t.} \begin{cases} 1^T \hat{t}(c) = \tau_T \\ \hat{l}_+^{enc}(c) \leq l_{max}^{enc} \\ \hat{l}_-^{enc}(c) \geq l_{min}^{enc} \\ \hat{l}_-^{raw}(c) \leq l_{max}^{raw} \\ \hat{l}_+^{raw}(c) \geq l_{max}^{raw} \end{cases} \tag{71}$$

However, this formulation suffers from two potential problems. The first drawback stems from our assumption that encoding end time for a frame i coincides with the encoding start time for the frame i+1. For example, if the i frame is dropped and the input buffer level falls below $l_{min}^{enc}$, the encoder will stall until the minimum buffer level is reached. This will make $\tau i$ non-negligible, which in turn will require ci to be very high (or even infinite if we assume that the nominal encoding time for a dropped frame is strictly zero). We overcome this problem by relaxing the constrain $c \leq c_{max}$. If some elements of the optimal complexity allocation vector c exceed the maximum complexity scale, we will say that the encoder yields a portion of its CPU time to other processes potentially competing with it over the CPU resources. This fact can be quantified by introducing a vector of CPU utilization $\eta = (\eta 1, \ldots, \eta n)^T$, where $0 \leq \eta i \leq 1$ expresses the fraction of the CPU time used by the encoder process in the time interval $[\hat{t}_{i-1}^{enc}, \hat{t}_i^{enc}]$, $\hat{t}_0^{enc} = 0$. Setting, $$n_i = \frac{c_{max}}{c_i^*}, \tag{72}$$

and $c = \min\{c^*, c_{max}\}$ the encoding complexity scale of frames with $c_i^*$ exceeding cmax will be set to cmax, and the utilizable CPU time will be lower than 100%. The second difficulty in the allocation problem (71) stems from the fact that sometimes the input and output buffer constrains may be conflicting (or, more formally, the feasible region may be empty).

Definition 2 (Ordered constrains). Given an ordered m-tuple of indicator functions $\chi = (\chi 1, \ldots, \chi m)^T$, $\chi i: R^n \to \{0, 1\}$, a vector x is said to satisfy the ordered constrains $\chi(x)$ if there exists no y with $\chi(y) < \chi(x)$, where < denotes the lexicographic order relation between binary strings.

Informally, this definition implies that in case of conflicting constrains, satisfying the first constrain is more important than satisfying the second one, and so on. Using this relaxed notion of constrained optimality, allocation problem (71) can be rewritten as $$\max_{c \geq cLmin} c \text{ s.t.} \begin{cases} \hat{l}_+^{raw}(c) \geq l_{min}^{raw} \\ \hat{l}_-^{raw}(c) \leq l_{max}^{raw} \\ \hat{l}_+^{enc}(c) \leq l_{max}^{enc} \\ \hat{l}_-^{enc}(c) \geq l_{min}^{enc} \\ 1^T \hat{t}(c) = \tau_T, \end{cases} \tag{73}$$

where the constrains are interpreted as ordered constrains.

The time complexity allocation (73) is solved using Algorithm 2 similar to Algorithm 1 for bit allocation. In the algorithm, we assume that the encoding time of a frame i as a function of ci is given by the model $$\hat{t}_i = \frac{\alpha_i^t + \beta_i^t q_i^t c_i}{n_i} = \frac{\gamma_i^t c_i}{n_i} \tag{74}$$

where the coefficients and $\alpha^t = (\alpha_1^t, \ldots, \alpha_n^t)^T$ and $\beta^t = (\beta_1^t, \ldots, \beta_n^t)^T$ depend on the frame content and frame types, and $\gamma^t = (\alpha_1^t + \beta_1^t q'_1, \ldots, \alpha_1^t + \beta_1^t q'_1)^T$.

Joint Bit and Encoding Time Allocation

Allocation problems (61) and (73) tacitly assume that allocation of quantization and encoder time complexity scales are independent. However, while it is reasonable to assume that the coding quality p is a function of q only (and, thus, is independent of c), the amount of produced bits b clearly depends on both parameters. This dependence couples together the two problems through the more accurate expression for the encoder bit buffer levels $$\hat{l}_-^{enc}(q,c) = l_0^{enc} + K\hat{b}(q,c) - r\hat{\tau}(c) \quad (75)$$

$$\hat{l}_+^{enc}(q,c) = l_0^{enc} + J\hat{b}(q,c) - r\hat{\tau}(c) \quad (76)$$

and the decoder bit buffer levels $$\hat{l}_-^{dec}(q,c) = l_0^{dec} + K\hat{b}(q,c) + \hat{r}^{dec}\hat{\tau}^{dec} \quad (77)$$

$$\hat{l}_+^{dec}(q,c) = l_0^{dec} - J\hat{b}(q,c) + \hat{r}^{dec}\hat{\tau}^{dec} \quad (78)$$

The convergence condition can be a bound on the change in $c^*$ and $q^*$, the number of iterations, or any combination thereof. Our practice shows that a single iteration of this algorithm usually produces acceptable allocation.

5 Frame Type Decision

The purpose of frame type decision is to associate with a sequence of n frames an optimal sequence of frame types. The

---

Algorithm 2: Max-min frame time complexity allocation.

input : n × 1 vectors $\gamma^t$ of time model parameters; initial encoder bit buffer level $l_0^{ENC}$; initial encoder raw frame buffer level $l_0^{raw}$; time budget $\tau T$; measured average encoder buffer draining rate r; frame rate F output : n × 1 optimal max-min complexity allocation vector $c^*$; n × 1 CPU time utilization vector $\eta$.

1. Find optimal equal complexity scale allocation $$c = \max\left\{\frac{\tau_T}{1T\gamma^t}, c_{min}\right\}$$

and set c = c · 1.

2. if $\hat{l}_+^{enc}(c) \leq l_{max}^{enc}$ and $\hat{l}_-^{enc}(c) \geq l_{min}^{enc}$ and $\hat{l}_-^{raw}(c) \leq l_{max}^{raw}$ and $\hat{l}_+^{raw}(c) \geq l_{min}^{raw}$ then set $c^* = c$
else 3    Find the smallest $1 \leq m \leq n$ for which one of the constrains is violated.

4    Compute the complexity constrains $$c_1 = \frac{l_{min}^{raw} - l_0^{raw} + m}{F \cdot (\gamma_1^t, \ldots, \gamma_m^t)1}$$

$$c_2 = \frac{l_{min}^{raw} - l_0^{raw} + m - 1}{F \cdot (\gamma_1^t, \ldots, \gamma_m^t)1}$$

$$c_3 = \max\left\{\min\left\{\frac{l_0^{enc} - l_{max}^{enc} + (\hat{b}_1, \ldots, \hat{b}_m)1}{r \cdot (\gamma_1^t, \ldots, \gamma_m^t)1}, c_2\right\}, c_1\right\}$$

$$c_4 = \min\left\{\max\left\{\frac{l_0^{enc} - l_{min}^{enc} + (\hat{b}_1, \ldots, \hat{b}_m)1}{r \cdot (\gamma_1^t, \ldots, \gamma_m^t)1}, c_1\right\}, c_2\right\}$$

and set c1 = max{max{c1, c3}, cmin} and c2 = min{c2, c4}.

5 if $\hat{l}_{m+1}^{enc}(c) \leq l_{max}^{enc}$ or $\hat{l}_{m+}^{raw}(c) \geq l_{min}^{raw}$ then set $\tau_T^0 = c_{min}(\gamma_1^t, \ldots, \gamma_m^t)1$ else set $\tau_T^0 = c_{max}(\gamma_1^t, \ldots, \gamma_m^t)1$ 6    Find $$c = \max\left\{\frac{\tau_T^0}{(\gamma_1^t, \ldots, \gamma_m^t)1}, c_{min}\right\}$$

and set $c_1^* = \ldots = C_m^* = c$.

7 Compute remaining time budget $\tau_T = \max\{\tau_T - c(\gamma_1^t, \ldots, \gamma_m^t)1, 0\}$ 8 Recursively invoke the algorithm with $\gamma^t = (\gamma_{m+1}^t, \ldots, \gamma_n^t)^T$, $l_0^{enc} = l_0^{enc} + (\hat{b}_1, \ldots, \hat{b}_m)1 - r\tau_T^0$ and $l_0^{raw} = l_0^{raw} + F(\gamma_1^t, \ldots, \gamma_m^t)1 - m$ to fix the remaining complexity scale values $(c_{m+1}^*, \ldots, c_n^*)$.

9 Set $\eta = c_{max}/c^*$ and $c^* = \max\{c^*, c_{max}\}$ 10 end

--- which now depend on both q and c. Unfortunately, a joint bit and time complexity allocation problem is not well-defined, since combining the two vector-valued objectives q and c can no more be treated using the max-min optimality framework, as the two vectors are non-commensurable.[3] However, joint allocation can be performed by alternatively solving the bit and time allocation problems, as suggested by the following algorithm

---

Algorithm 3: Joint frame bit and encoding complexity allocation.

Initialization: Set $c^* = 1$
1 repeat
2    Fix $c = c^*$ and find the optimal quantizer allocation $q^*$ by solving (61).
3    Fix $q = q^*$ and find the optimal time complexity allocation $c^*$ by solving (73).
4 until until convergence

--- frame type with which an i-th frame is encoded is denoted by $f_i$. To simplify notation, we assume that $f_i$ also specifies whether the frame is used as reference, whether it is an IDR, and which frames are used for its temporal prediction (unless it is a spatially predicted frame). For example a frame i=1 can be IDR, I, P predicted from frame 0, or DROP. The space of possible frame type assignment for a frame i is denoted by $F_i$, and depends solely on the status of the reference buffer immediately before the frame is encoded, denoted by $R_i$ ($R_i$ is defined as the list of reference frame indices). Speaking more broadly, $F_i$ is a function of the encoder state immediately prior to encoding a frame i, defined as the pseudo-vector $$\sigma_i = (R_i, l_{i-}^{enc}, l_{i-}^{raw}, l_{i-}^{dec}, t_i^{nd}, t_i^{idr}) \quad (79)$$

where $l_{i-}^{enc}$, $l_{i-}^{raw}$, and $l_{i-}^{dec}$ denote the levels of the encoder bit buffer, raw buffer, and decoder bit buffer, respectively, denotes the index of the last non-dropped frame, and denotes the presentation time of the last IDR frame. $\sigma_i$ fully defines the instantaneous encoder state. In practice, only estimated buffer levels are available. We will henceforth denote the estimated encoder state by $$\hat{\sigma}_i = (R_i, \hat{l}_{i-}^{enc}, \hat{l}_{i-}^{raw}, \hat{l}_{i-}^{dec}, t_i^{nd}, t_i^{idr}) \quad (80)$$

Note that $R_i$, $t_i^{nd}$, and, $t_i^{idr}$ in $\hat{\sigma}_i$ are fully deterministic.

It is important to observe that $f_i$ does not fully define the set of control parameters required by the encoder in order to encode the i-th frame, as it does not specify the quantization and complexity scales $q_i$ and $c_i$. In order to separate the optimization of frame type and reference indices from the optimal quantizer and complexity allocation, we assume that given the sequence of frame types $f=(f_1, \ldots, f_n)$, the allocation algorithms described in the previous section are invoked to find $q(f)=(q^*_1, \ldots, q^*_n)$ and $c(f)=(c^*_1, \ldots, c^*_n)$ As consequence, the amount of bits produced and the amount of time consumed by encoding the i-th frame can be expressed as functions of f. To simplify notation, we will denote the latter quantities by bi and τi, respectively. Similarly, pi will denote the distortion of the i-th frame. In the case where $f_k$=DROP, the distortion is evaluated as the PSNR of the difference between the original frame i and the last displayed frame $t_i^{nd}$.

We jointly refer to $a_i=(f_i, q^*_i, c^*_i)$ as the encoder action for the frame i. Note that although $a_i$ is defined for a single frame, the optimal values of $q^*_i$ and $c^*_i$ depend on the $f_i$'s of the entire sequence of frames $1, \ldots, n$. As consequence, a can be determined only as a whole, i.e. $a_{i+1}$ is required in order to determine $a_i$.

Encoder State Update

Given the encoder state $\sigma_i$ and the action $a_{i+1}$ the next state $\sigma_{i+1}$ is unambiguously determined by the state update rule $\sigma_i=\sigma(\sigma_i,a_i)$. In practice, the update rule is applied to the estimated state, $\hat{\sigma}_{i+1}=\sigma(\hat{\sigma}_i,a_i)$. The update for the buffer levels is given by $$\hat{l}_{i+1-}^{enc} = \hat{l}_{i-}^{enc} + \hat{b}_i - r_i\hat{\tau}_i$$

$$\hat{l}_{i+1-}^{raw} = \hat{l}_{i-}^{raw} + F\hat{\tau}_i - 1$$

$$\hat{l}_{i+1-}^{dec} = \hat{l}_{i-}^{dec} + \hat{b}_i + \hat{r}_i^{dec}(t_{i+1}^{dec} - t_i^{dec}), \quad (81)$$

where $t_i^{dec}$ is the decoding time stamp of the i-th frame, $r_i$ is the average encoder bit buffer draining rate at the time $t_i^{enc}$, and $\hat{r}_i$ is the predicted decoder bit buffer filling rate at the time $t_i^{dec}$. The last displayed is updated according to $$t_{i+1}^{nd} = \begin{cases} t_i^{nd} & : f_i = DROP \\ i & : \text{else}. \end{cases} \quad (82)$$

The last IDR presentation time stamp is updated according to $$t_{i+1}^{idr} = \begin{cases} t_i & : f_i = IDR \\ t_i^{idr} & : \text{else}. \end{cases} \quad (83)$$

The reference buffer is updated according to the sliding window policy $$R_{i+1} = \begin{cases} \emptyset & : f_i = IDR \\ R_i & : f_i \in NONREF \\ \{i\} \cup R_i & : f_i \in REF \text{ and } |R_i| < R_{max} \\ \{i\} \cup R_i \setminus \{\min R_i\} & : \text{else}, \end{cases} \quad (84)$$

where min $R_i$ denotes the smallest frame index found in the reference buffer, $|R_i|$ denotes the number of frames in the reference buffer, and $R_{max}$ stands for the maximum reference buffer occupancy. It is important to emphasize that though the next state $\sigma_{i-1}$ 1 depends only on $\sigma_i$ and $a_i$, $a_i$ itself depends on $a_1, \ldots, a_{i-1}, a_{i+1}, \ldots, a_n$. Formally, this can be expressed by saying that the update of the full encoder state is non-Markovian. However, some constituents of the encoder state do satisfy the Markovian property. We denote by $$\sigma_i^M = (R_i, t_i^{nd}, t_i^{idr}) \quad (85)$$

the Markovian part of the state, whose update rule can be expressed as $$\sigma_{i+1}^M = \sigma(\sigma_i^M, f_i) \quad (86)$$

(note the dependence on $f_i$ only). On the other hand, the remaining constituents of the encoder state $$\hat{\sigma}_i^{NM} = (l_{i-}^{enc}, l_{i-}^{raw}, l_{i-}^{dec}) \quad (87)$$

are non-Markovian, since their update rule requires and which, in turn, depend on the entire sequence f through q* and c*. The update rule for $\sigma_i^{NM}$ is a function of the initial state $\sigma_1^{NM}$, and the entire f $$\sigma_i^{NM} = \sigma(\sigma_1^{NM}, f) \quad (88)$$

Action Sequence Cost

Given a sequence of encoder actions $a=(a_1, \ldots, a_n)$, we associate with it a sequence cost ρ(a), defined as $$p(a, \hat{\sigma}) = \lambda_{buf} \sum_{i=1}^{n} P_{buf}(\hat{l}_{i+}^{dec}) + \lambda_{dis} \sum_{i=1}^{n} Pdis(\hat{P}_i) + \\ \lambda bit \sum_{i=1}^{n} P_{bit}(\hat{b}_i) + \lambda_{drop} \sum_{i=1}^{n} P_{drop}(f_i, \hat{p}_i, \hat{p}_i^{min}) + \\ \lambda_{idr} \sum_{i=1}^{n} P_{idr}(f_i, t_i, t_i^{idr}) + \lambda_{qp} \sum_{i=1}^{n} P_{qp}(q_i'), \quad (89)$$

where typically $\lambda_{buf}=10, \lambda_{dis}=1, \lambda_{bit}=100, \lambda_{idr}=0.5, \lambda_{qp}=0.01$ The constituent terms of the cost function are defined as follows.

Buffer cost penalizing the estimated decoder bit buffer violation is defined as $$p_{buf}(\hat{l}_{k+}^{dec}) = h_{os}(\hat{l}_{k+}^{dec}, l_{min}^{dec}) + h_{os}(l_{tot}^{dec} - \hat{l}_{k+}^{dec}, l_{tot}^{dec} - l_{max}^{dec}) \quad (90)$$

where $\hat{l}_{i+}^{dec} = \hat{l}_{i-}^{dec} - \hat{b}_i$, $$h_{os}(x, y) = \frac{y}{\epsilon^2} \cdot \max\{\epsilon - \min\{x, \epsilon\}, 0\} + \max\left\{\frac{y}{\max\{x, e\}}, 1\right\} - 1 \quad (91)$$

is a single-sided hyperbolic penalty function, and ϵ is a small number, typically $\epsilon \approx 10^{-6}$ Distortion cost penalizing the frame distortion is given by $$p_{dis}(\hat{p}_i) = 255^2 \cdot 10^{-0.1 \hat{p}i}. \quad (92)$$

Drop cost penalizing the dropped frame distortion is given by $$P_{drop}(f_i, \hat{p}_i, \hat{p}_i^{min}) = \begin{cases} 255^2(10^{-0.1\hat{p}_i^{min}} - 10^{-0.1\hat{p}_i}) & : f_i = DROP \\ 0 & : else, \end{cases} \quad (93)$$

where $\hat{p}_i^{min}$ is the estimated minimum PSNR. For a dropped frame, $\hat{p}_i^{min}$ is computed as the 0.1%-quantile of the PSNR of the difference between the original frame i and the last displayed frame $l_i^{nd}$. For a non-dropped frame, $\hat{p}_i^{min} = \hat{p}_i$.

IDR cost for penalizes for a too early IDR frame, $$p_{idr}(t_i, t_i^{idr}) = \begin{cases} \infty & : t_i - t_i^{idr} < t_{min}^{idr} \\ 0 & : else. \end{cases} \quad (94)$$

For $f_i \neq IDR$, the cost is given by $$p_{idr}(t_i, t_i^{idr}) = \begin{cases} \infty & : t_i - t_i^{idr} > t_{max}^{gop} \\ 0 & : t_i - t_i^{idr} < t_{min}^{idr} \\ \frac{t_i - t_i^{idr} - t_i^{idr}}{t_{max}^{gop} - t_{min}^{idr}} & : else, \end{cases} \quad (95)$$

penalizing for a too late IDR frame. The cost is constructed in such a way that an IDR is placed in the time interval $[t_{min}^{idr}, t_{max}^{gop}]$.

Quantizer fluctuation cost penalizes on the deviation from the average sequence quantization parameter according to $$P_{idr}(q'_i) = \max\{2^{q'_i - q'}, 2^{\bar{q}' - q'_i}\} - 1, \quad (96)$$

where $\bar{q}'_i$ is the average quantization parameter in the previous non-dropped frames, computed as a decaying weighted average $$\bar{q}'_i = \frac{\bar{q}_i'^{num}}{\bar{q}_i'^{den}}, \quad (97)$$

where $$\bar{q}_i'^{num} = \begin{cases} \bar{q}'_{i-1} & : f_i = DROP \\ \lambda \bar{q}_{i-1}'^{num} + q_i - 1 & : else, \end{cases} \quad (98)$$

$$\bar{q}_i'^{den} = \begin{cases} \bar{q}_{i-1}'^{den} & : f_i = DROP \\ \lambda \bar{q}_{i-1}'^{den} + 1 & : else. \end{cases} \quad (99)$$

The decay parameter is set $\lambda = 0.99$, and may be adjusted according to the sequence frame rate.

Bit budget deviation cost penalizes for action sequences resulting in a deviation from the allocated bit budget $b_T$ $$P_{bit}(\hat{b}) = \left(\max\left\{\frac{b_T}{\bar{b}_T} - 1, 0\right\} + \max\left\{\frac{\bar{b}_T}{b_T} - 1, 0\right\}\right) \cdot h_{oe}\left(\frac{1^T \hat{b}}{b_T}\right), \quad (100)$$

where $$h_{oe}(x) = \max\left\{e^{\frac{x-1}{\epsilon}} - 1, 0\right\}, \quad (101)$$

and $\epsilon = 0.1$.

Action Sequence Optimization

Using the notion of the action sequence cost, the frame type optimization problem can be expressed as the minimization problem $$\min_f p(f, q^*(f), c^*(f), \sigma^*) \quad (102)$$

Since the search space $F_1 \times \ldots \times F_n$ is usually very large, the complexity of finding the best action sequence by exhaustive search is prohibitive. Due to the non-Markovian property of the cost function, no greedy Markov decision algorithms can be employed. However, one can construct a Markovian lower bound for $\rho$, depending on $f_i$ only, and allowing to prune the search space significantly We observe that though the estimated frame distortion $\hat{p}_i$ depends on the selection of the quantizer, it can be bounded below by the distortion achieved if $b_T$ bits were allocated to the i-th frame alone. The lower bound $\hat{p}_{-i}$ on the frame distortion can be expressed as $$\hat{p}_{-i} = \begin{cases} \hat{p}_i : & f_i = DROP \\ \hat{p}_i(\max\{\hat{q}_i(b_T), q_{min}\}) : & else, \end{cases} \quad (103)$$

where $\hat{q}(b)$ is the inverse function of $\hat{b}(q)$ given by $$\hat{q}_i(b) = \frac{\beta_i^b}{b - \alpha_i^b}, \quad (104)$$

(the model coefficients $\alpha_i^b$ and $\beta_i^b$ depend on fi). For dropped frames, the bound is exact; moreover, $\hat{p}_i^{min}$ can be estimated as well.

Aggregating the terms of $\rho$ that do not depend on the quantizer, the following lower bound on the action cost is obtained.

$$\underline{\rho}(f_i) = \lambda_{dis} P_{dis}(f_i, \hat{\underline{p}}) + \lambda_{drop} P_{drop}(\hat{\underline{p}}, \hat{p}_i^{min}) + \lambda_{idr} P_{idr}(f_i, t_i, t_i^{idr}) \quad (105)$$

(though a lower bound on the buffer penalty $\rho_{buf}$ can also be devised, we do not use it here for simplicity). Note that unlike $\rho$, $\underline{\rho}$ is additive, that is $$\underline{\rho}(f) = \sum_{i=1}^n \underline{\rho}(a_i). \quad (106)$$

The lower bound $\underline{\rho}(a)$ is used in the branch and bound Algorithm 4 for solving the combinatorial minimization problem (102). The algorithm is first invoked with $f = \emptyset$, $\rho = \infty$, and the current state of the encoder. The order of the loop searching over all feasible frame types $F_1$ should be selected to maximize the probability of decreasing the bound $\rho$ as fast as possible. Typically, the best ordering of F is DROP, followed by P (if multiple reference frames are available, they are ordered by increasing display time difference relative to the current frame), followed by IDR. Though not considered here, non-IDR I frames and non-reference P or B frames can be straightforwardly allowed for as well.

In the case where complexity allocation is performed after bit allocation and the latter is not reiterated, complexity allocation may be removed from the frame type decision algorithm and performed after the optimal frame types are assigned.

Branch and Bound Frame Type Decision Algorithm

```
input :    sequence of n frames; best frame type decision f so far; initial non-Markovian state
           ô₁^NM ; current Markovian state σ₁^M
output :   optimal action sequence a*; optimal action sequence cost p* = p(a *) ;lower bound
           ρ.
1   if n ≤ 0 then
    // Leaf reached
2       From f and ô₁^NM , allocate the sequence bit budget b_T
3       Find optimal frame quantizer allocation q* .
4       From f and ô₁^NM , allocate the sequence encoding time budget τ_T
5       Find optimal frame encoding complexity allocation c*
6       Form action sequence a* = (f ,q* ,c*).
7       Compute sequence cost ρ* = ρ(a* ,ô)
8       if ρ* <ρ then update lower bound ρ = ρ*
9   else
10      Set ρ* = ∞.
11      for all f₁ ∈ F₁ do
12          if ρ(f₁) >ρ then continue // Prune subtree
13          Compute the updated Markovian encoder state σ₂^M = σ(σ₁^M ,f₁).
14          Add f₁ to the current f and invoke the algorithm recursively for the remaining n - 1 frames
            in the sequence, producing the action sequence a, its cost ρ, and an updated bound ρ.
15          if ρ < ρ* then ρ* = ρ,a* = a . // Update current best action sequence
16      end
17  end
```

Figure 4:
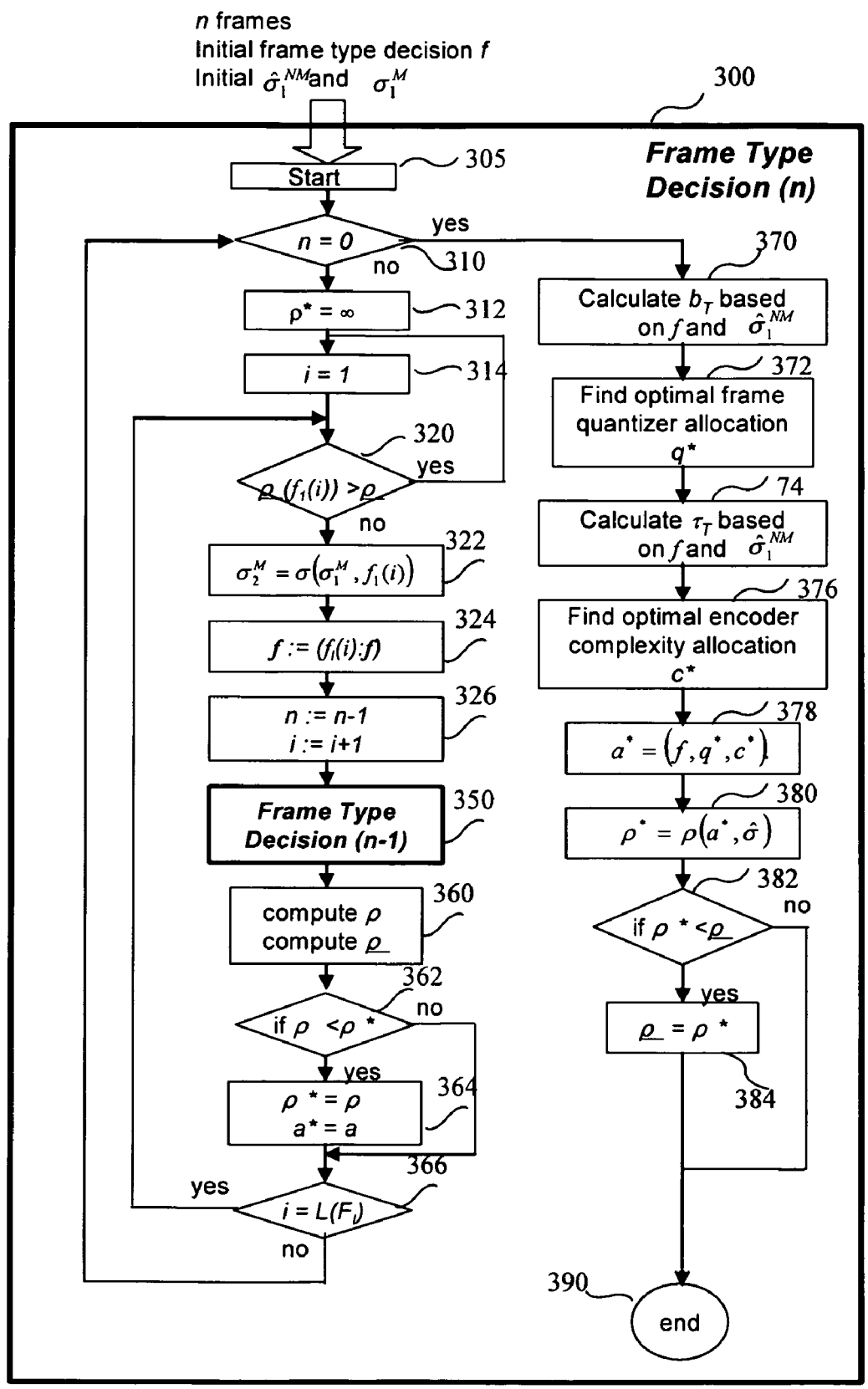
FIG. 4. Flow diagram of branch and bound frame type decision algorithm.

A flow chart corresponding to the Branch and bound frame type decision algorithm is shown in FIG. 4, where the frame type decision function is shown as a recursive process. The Frame Type Decision (n) 300 with n frames is shown to call itself with (n−1) frames as the parameters, i.e., Frame Type Decision (n−1) 350. The function first checks whether the recursion reaches end, i.e., whether n≦0. If the recursion reaches its end, the algorithm outputs frame bit budget $b_T$ at step 370 for the Frame Bit Budget Allocation to come up the optimal allocation q* at step 372. On the other hand, the frame complexity in term of processing time is computed at step 374 and the Frame Time Budget Allocation derives the optimal encoder complexity allocation c* according the frame processing time $\tau_T$ at step 376. The optimal actions sequence a* and associated sequence cost ρ* are updated at steps 378 and 380. The optimal sequence cost ρ* is then compared with the lower bound ρ at step 382 and the lower bound is updated if ρ* is smaller than ρ, at step 384. This processing is also described in the sequence-level controller flow diagram as shown in FIG. 3.

When the recursion does not reach its end, the system initializes the sequence cost function by assigning its value to infinity at step 312 and starts the iteration for every possible frame type $f_1$. The number of all frame type of $F_1$ is denoted by $L(F_1)$ the index i used to process all possible frame types by initializing i to 1 at step 314 and checking the ending condition i≦$L(F_1)$ at step 366. For each frame type of $f_1$, the corresponding sequence cost is computed and compared with the lower bound at ρ step 320. If the computed cost is higher than the lower bound, no further processing is needed as shown as the "yes" branch at step 320.

If the computed sequence cost is smaller than the lower bound, the Markovian encoder state is updated at step 322 and the frame type $f_1$ is added to the sequence frame type f at step 324. Both the frame index n and the frame type index i are updated at step 326. After the frame index is decremented by 1, the Frame Type Decision recursion occurs as the step 350 is within in main function at step 300. The corresponding action sequence, sequence cost, and lower bound on the sequence cost are updated at step 360. The sequence cost is then compared with the optimal cost at step 362 and the optimal action sequence and sequence cost are updated at step 364 if the newly computed cost is lower.

Encoding Order Optimization

Given a sequence of n frames indexed by incrementing display order, the purpose of encoding order optimization is to find their optimal encoding order. For notation convenience, we denote the frame reordering as a permutation π of $\{1, \ldots, n\}$. We also denote by $a^*(\pi)$ and $\rho^*(\pi)$ the optimal action sequence and its cost, respectively, found using the frame type decision algorithm from the previous section applied to the ordered sequence of frames $\pi_1, \ldots, \pi_n$. Using this formalism, encoding order optimization can be expressed as finding the permutation minimizing $$\min_{\pi \in \Pi} p * (\pi) \tag{107}$$

Since out-of-display-order encoding requires temporary storing the decoded frames until the next consecutive frame has been decoded, the search space of feasible permutations is constrained by the decoded picture buffer level. In H.264, the decoded picture buffer is shared with the reference buffer.

We augment the Markovian component of the encoder state with the last displayed frame index $t_i^{disp}$ specifying the largest frame index that has been consecutively decoded from the sequence start at the time when frame i is being encoded. The last displayed frame is updated according to $$t_{i+1}^{disp} = \begin{cases} t_i^{disp}: & \min\{\min R_i, \pi_i\} > t_i^{disp} + 1 \\ \maxcon(R_i): & \text{else,} \end{cases} \tag{108}$$

where con(Ri) denotes the largest subsequence of consecutive frame indices in Ri starting with min Ri (e.g., if $R_i=\{1, 2, 3, 5\}$, con($R_i$)={1, 2, 3}; if R $R_i=\{1, 3, 4, 5\}$, con($R_i$)={1}, etc). We also modify the state update rule for the reference buffer as $$R_{i+1} = \quad (109)$$
$$\begin{cases} \overline{R}_{i+1}: & |\overline{R}_{i+1}| \le R_{max} \\ \overline{R}_{i+1} \setminus \{k \in con(\overline{R}_{i+1}, R_{max} - |\overline{R}_{i+1}|): k \le t_i^{disp}\}: & \text{else,} \end{cases}$$

$$\text{where } \overline{R}_{i+1} = \begin{cases} \emptyset: & f_i = IDR \\ R_i: & f_i \in NONREF \\ \{\pi_i\} \cup R_i: & f_i \in REF, \end{cases} \quad (110)$$

and $con(R_i, k)$ denotes the sequence of at most k smallest elements in $con(R_i)$ (or less, if $|con(R_i)|<k$). Note that $\pi_i$ replaces i, and the update scheme now allows frames to be locked in the reference buffer until a consecutive sequence is formed.

In order to satisfy the reference buffer size constrains, $|R_i| \le R_{max}$ has to hold for every frame in the sequence. This condition can be verified prior to minimizing $\rho^*(\pi)$; permutations not satisfying the reference buffer constrains are discarded from the search space. In some applications, additional constrains may apply to $\Pi$ in order to enforce further frame ordering regularity. For example $\Pi$ may be restricted to few pre-defined ordering patterns providing regular single- or multi-level temporal scalability of the encoded sequence. The encoding order optimization procedure is summarized in following algorithm.

Encoding Order Optimization Algorithm

```
input :          sequence of n frames.
output:          optimal permutation π; optimal action sequence
                 a* ; optimal action sequence cost
                 ρ* = ρ(a*)
initialization:  Set ρ = ρ* = ∞.
1  for all π do
2     Verify reference buffer conditions.
3     if |R_i| > R_max for any i then continue
4     Invoke the frame type decision algorithm on the sequence of
      frames π_1, ..., π_n, producing the action sequence a,
      its cost ρ, and an updated bound ρ.
5     if ρ < ρ*, then ρ* = ρ, a* = a, π* = π.
6  end
```

Figure 5:
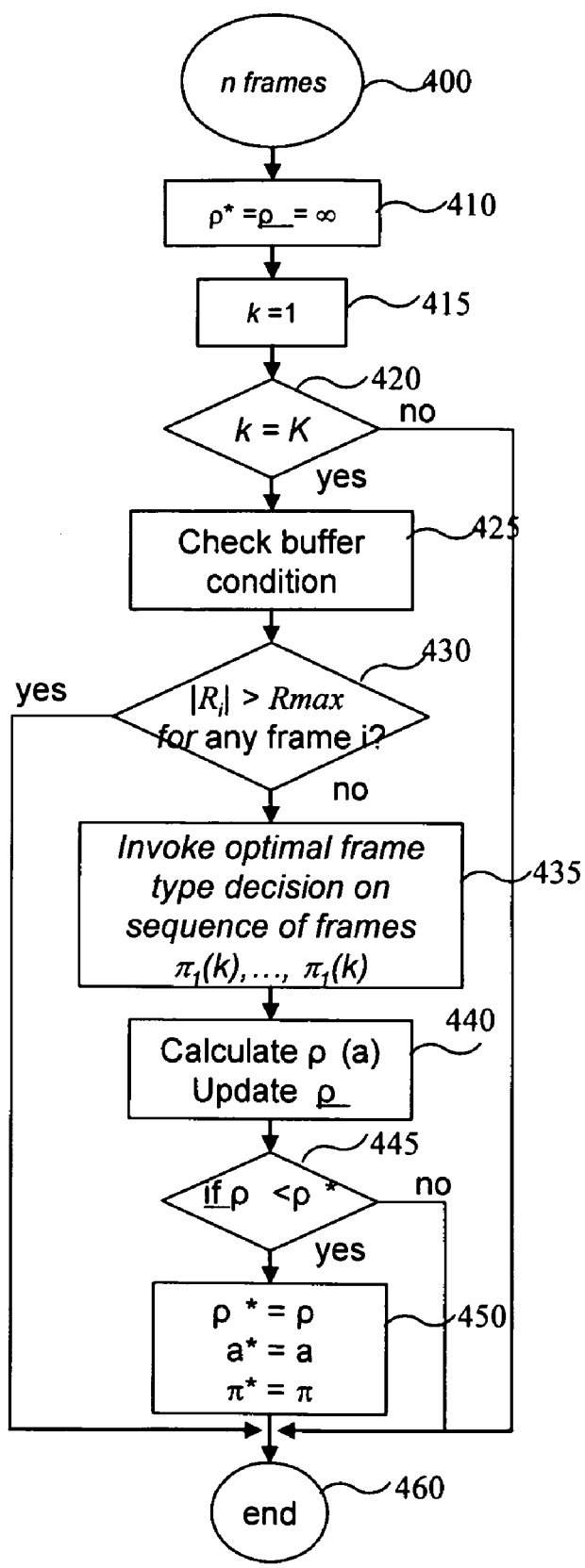
FIG. 5. Flow diagram of encoding order optimization

The flow chart of the encoding order optimization algorithm is shown in FIG. 5. The process starts with n frames at step 400 and an initial sequence cost of infinity. The total number for possible sequence order is K. In order to go through all possible sequence order, iteration is used with index k with initial value of 1 at step 415 and the termination condition is checked at step 420. The reference buffer is verified at step 425 and the reference buffer is compared with the maximum buffer size for all i at step 430 and no further processing is the overflow condition occurs. If the buffer condition is satisfied, the optimal frame type decision is invoked at step 435 and the sequence cost corresponding to the action sequence is calculated at step 440. The lower bound is also compared with this new sequence cost and is updated as well. The new sequence cost is compared with the optimal cost at step 445. If the new cost is lower than the optimal cost, the optimal cost, optimal action sequence and optimal sequence order are all updated at step 450. When the process is complete at step 460, the final optimal sequence order, optimal action sequence and sequence cost are the outputs from the encoding order optimization algorithm.

The invention claimed is:

1. A method of encoding video sequence, comprising:
receiving an input video sequence containing pictures;
receiving a resource budget for the sequence; and
receiving a sequence cost function; and
generating an optimal action sequence to produce an encoded version of the sequence to achieve a minimum sequence cost within the sequence resource budget, further comprising of
generating an optimal permutation of the sequence of pictures and
generating an optimal set of encoder parameters for each picture;
wherein generating an optimal action sequence is performed by solving the optimization problem $$\min_{a, \pi} f(a_\pi) \text{ subject to } r(a_\pi) \le r_0$$

where
$a = (a_1, \ldots, a_n)$ is the encoder action for the sequence, $a_i$ is the set of encoder parameters for the ith picture and N is the number of pictures in the sequence;
$\pi$ is a permutation of the picture indices $1, \ldots, N$, and $a_\pi = (a_{\pi(1)}, \ldots, a_{\pi(N)})$ is the action sequence for the permuted sequence of pictures;
$f$ is the sequence cost function;
$r(r_1, \ldots, r_K)$ is the vector of K resources required to encode the sequence with action a; and $r_0$ is the vector of budgeted resources;
wherein the optimal permutation $\pi^*$ and optimal action sequence $a^*$ are found by performing the following steps
Start: set best cost $\rho^*$ to infinity;
For each candidate permutation $\pi$ of the indices $\{1, \ldots, N\}$ perform
Step 1: Verify whether $\pi$ is an admissible permutation; If yes, continue to next step; otherwise, skip to next candidate permutation;
Step 2: Find the optimal action sequence a and its cost $\rho$ on the sequence of pictures $\pi_1, \ldots, \pi_n$;
Step 3: If $\rho < \rho^*$, update $a^* = a, \ldots, \pi^* = \pi$, and $\rho^* = \rho$;
End.

2. A method according to claim 1, where a permutation is deemed admissible if it does not violate the encoder reference buffer constraints.

3. A method of claim 1, wherein the optimal action sequence corresponding to a candidate permutation $\pi$ is found by receiving as the input the permuted sequence of pictures $\pi_1, \ldots, \pi_n$ and the current encoder state, and outputting the solution of the optimization problem $$\min_{a} f(a_\pi) \text{ subject to } r(a_\pi) \le r_0$$

for fixed $\pi$.

* * * * *